(12) United States Patent
Yamamoto

(10) Patent No.: US 9,304,303 B2
(45) Date of Patent: Apr. 5, 2016

(54) ZOOM LENS SYSTEM, IMAGING OPTICAL DEVICE, AND DIGITAL APPARATUS

(75) Inventor: Yasushi Yamamoto, Tokyo (JP)

(73) Assignee: KONICA MINOLTA, INC. (JP)

( * ) Notice: Subject to any disclaimer, the term of this patent is extended or adjusted under 35 U.S.C. 154(b) by 436 days.

(21) Appl. No.: 13/980,758

(22) PCT Filed: Jan. 16, 2012

(86) PCT No.: PCT/JP2012/050663
§ 371 (c)(1),
(2), (4) Date: Jul. 19, 2013

(87) PCT Pub. No.: WO2012/102105
PCT Pub. Date: Aug. 2, 2012

(65) Prior Publication Data
US 2013/0300868 A1    Nov. 14, 2013

(30) Foreign Application Priority Data

Jan. 24, 2011  (JP) ................................ 2011-011794
Jan. 24, 2011  (JP) ................................ 2011-011807

(51) Int. Cl.
*G02B 15/14* (2006.01)
*G02B 15/173* (2006.01)
*H04N 5/225* (2006.01)

(52) U.S. Cl.
CPC .............. *G02B 15/14* (2013.01); *G02B 15/173* (2013.01); *H04N 5/225* (2013.01)

(58) Field of Classification Search
CPC ...... G02B 15/173; G02B 15/14; G02B 15/28; G02B 9/34; G02B 13/004
USPC .................................................. 359/642–830
See application file for complete search history.

(56) References Cited

U.S. PATENT DOCUMENTS 7,551,366 B2   6/2009  Suzaki et al.
7,990,624 B2   8/2011  Fujisaki (Continued)

FOREIGN PATENT DOCUMENTS

JP    2005-308998 A    11/2005
JP    2006-184416 A    7/2006

(Continued)

OTHER PUBLICATIONS

Interanational Search Report for International Application No. PCT/JP2012/050663, mailed Apr. 3, 2012, with English translation.

*Primary Examiner* — Mahidere Sahle
(74) *Attorney, Agent, or Firm* — Cantor Colburn LLP

(57) ABSTRACT

A positive-negative-positive-positive-positive zoom lens changes magnification by moving each of a first group to a fourth group so as to alter the interval between each group. The third group comprises first and second lens components, at least one of which has an aspheric surface, and the first lens component is a positive-negative-positive cemented lens in sequence from the object side. The zoom lens satisfies the conditional expressions, $7<\beta 2t/\beta 2w<10$, $5<\beta 3t/\beta 3w<12$, $0.7<(\beta 2t/\beta 2w)/(\beta 3t/\beta 3w)<1.65$ (where: $\beta 2t$ is the lateral magnification of the second group at the telephoto end; $\beta 2w$ is the lateral magnification of the second group at the wide end; $\beta 3t$ is the lateral magnification of the third group at the telephoto end; and $\beta 3w$ is the lateral magnification of the third group at the wide end).

20 Claims, 21 Drawing Sheets

(56) References Cited

U.S. PATENT DOCUMENTS

2007/0053079 A1  3/2007  Nanjo et al.
2007/0223106 A1  9/2007  Kamo et al.

FOREIGN PATENT DOCUMENTS

| | | |
|---|---|---|
| JP | 2007-3554 A | 1/2007 |
| JP | 2007-256604 A | 10/2007 |
| JP | 2008-158062 A | 7/2008 |
| JP | 2009-282439 A | 12/2009 |

FIG.11A (EX1)
FNO=3.04
(W)
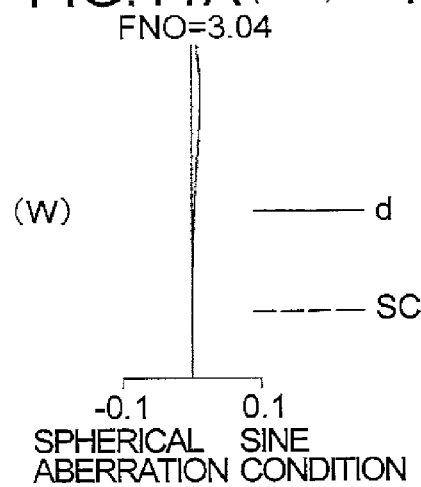
— d
---- SC
-0.1   0.1
SPHERICAL SINE
ABERRATION CONDITION
FIG.11B (EX1)
Y'=4.0
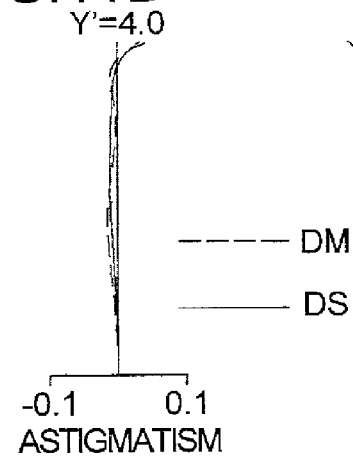
---- DM
— DS
-0.1   0.1
ASTIGMATISM
FIG.11C (EX1)
Y'=4.0
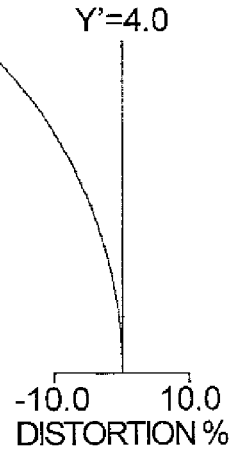
-10.0   10.0
DISTORTION %
FIG.11D (EX1)
FNO=4.95
(M)
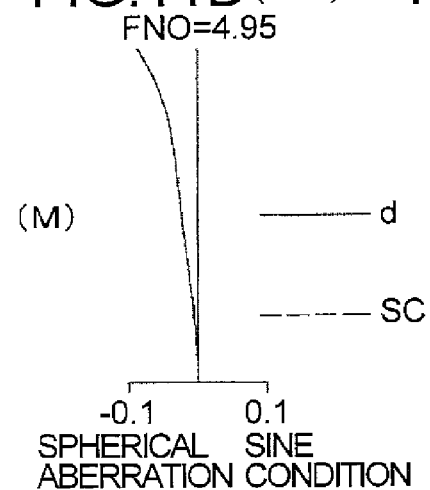
— d
---- SC
-0.1   0.1
SPHERICAL SINE
ABERRATION CONDITION
FIG.11E (EX1)
Y'=4.0
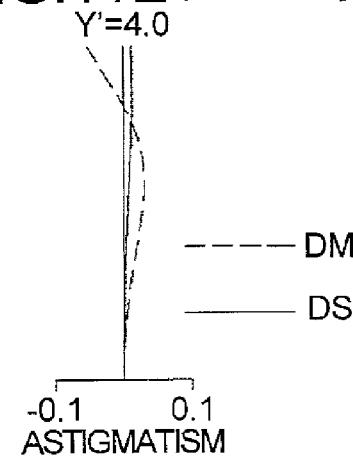
---- DM
— DS
-0.1   0.1
ASTIGMATISM
FIG.11F (EX1)
Y'=4.0
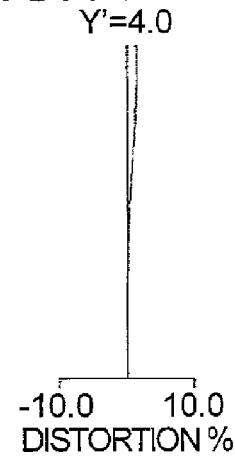
-10.0   10.0
DISTORTION %
FIG.11G (EX1)
FNO=5.70
(T)
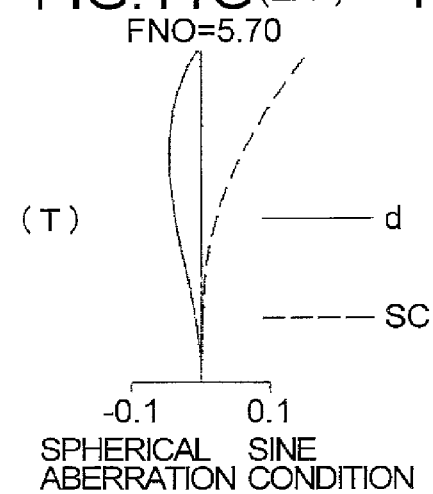
— d
---- SC
-0.1   0.1
SPHERICAL SINE
ABERRATION CONDITION
FIG.11H (EX1)
Y'=4.0
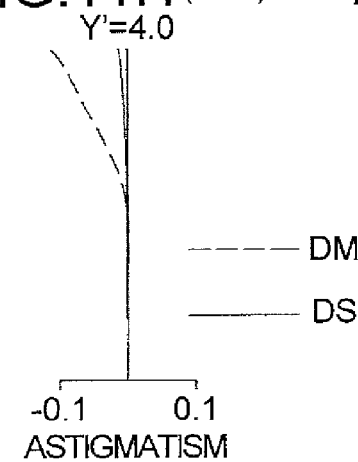
---- DM
— DS
-0.1   0.1
ASTIGMATISM
FIG.11I (EX1)
Y'=4.0
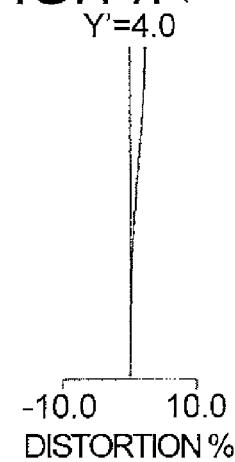
-10.0   10.0
DISTORTION %

FIG.13A (EX3) FNO=3.49
FIG.13B (EX3) Y'=4.0
FIG.13C (EX3) Y'=4.0
(W)
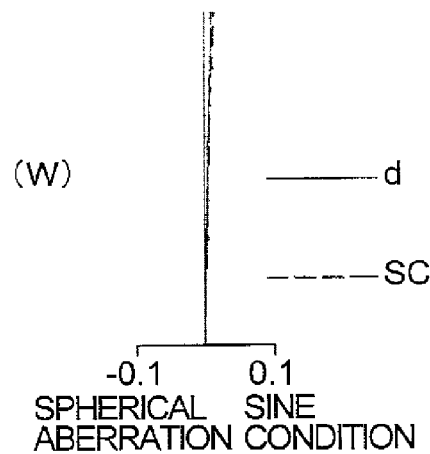
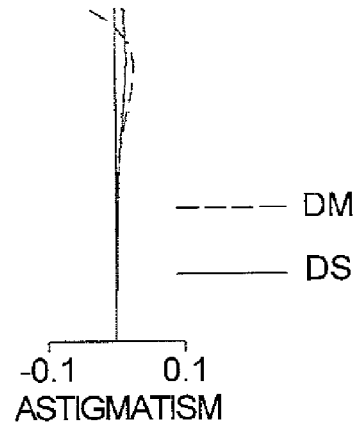
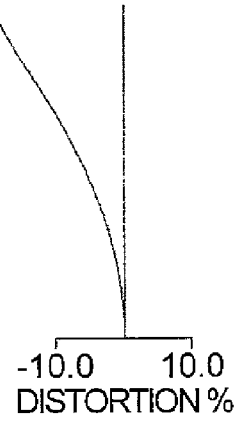
SPHERICAL SINE
ABERRATION CONDITION
ASTIGMATISM
DISTORTION %
FIG.13D (EX3) FNO=5.23
FIG.13E (EX3) Y'=4.0
FIG.13F (EX3) Y'=4.0
(M)
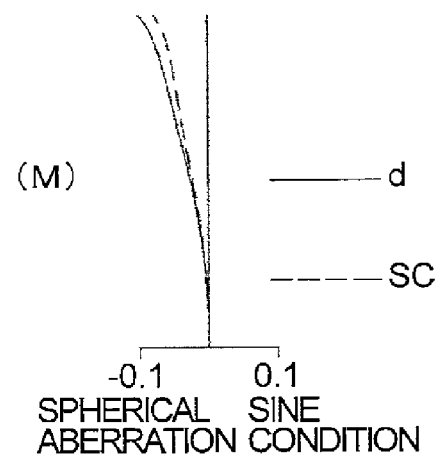
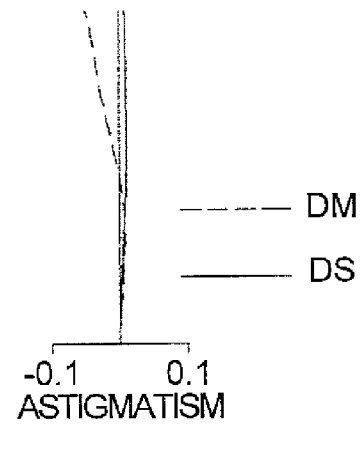
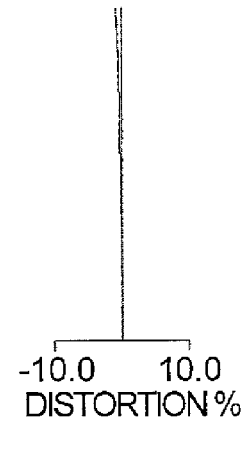
SPHERICAL SINE
ABERRATION CONDITION
ASTIGMATISM
DISTORTION %
FIG.13G (EX3) FNO=5.85
FIG.13H (EX3) Y'=4.0
FIG.13I (EX3) Y'=4.0
(T)
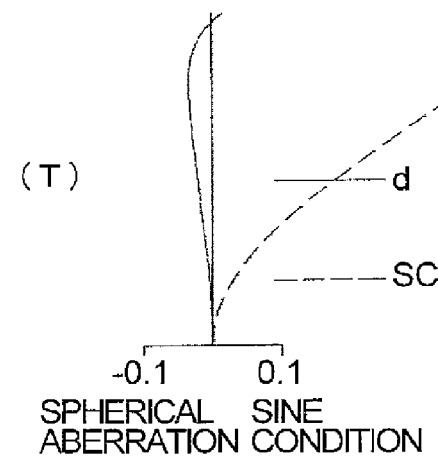
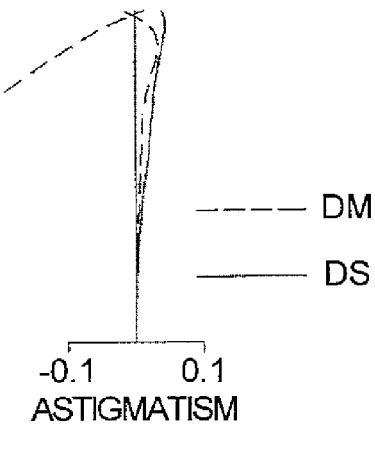
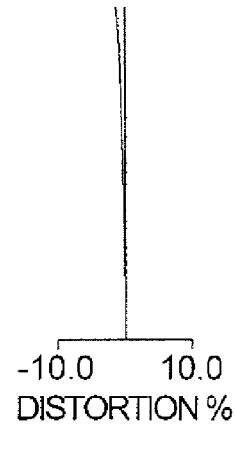
SPHERICAL SINE
ABERRATION CONDITION
ASTIGMATISM
DISTORTION %

FIG.14A (EX4) FNO=3.13

(W)
— d
- - - - SC

-0.1  0.1
SPHERICAL SINE
ABERRATION CONDITION

-0.1  0.1
ASTIGMATISM

FIG.14C (EX4) Y'=4.0

-10.0  10.0
DISTORTION %

FIG.14D (EX4) FNO=5.01

(M)
— d
- - - - SC

-0.1  0.1
SPHERICAL SINE
ABERRATION CONDITION

-0.1  0.1
ASTIGMATISM

FIG.14F (EX4) Y'=4.0

-10.0  10.0
DISTORTION %

FIG.14G (EX4) FNO=5.90

(T)
— d
- - - - SC

-0.1  0.1
SPHERICAL SINE
ABERRATION CONDITION

-0.1  0.1
ASTIGMATISM

FIG.14I (EX4) Y'=4.0

-10.0  10.0
DISTORTION %

FIG.15A (EX5) FNO=3.09
FIG.15B (EX5) Y'=4.0
FIG.15C (EX5) Y'=4.0

(W)
— d
----- SC
----- DM
— DS

-0.1   0.1
SPHERICAL SINE
ABERRATION CONDITION

-0.1   0.1
ASTIGMATISM

-10.0   10.0
DISTORTION %

FIG.15D (EX5) FNO=4.97
FIG.15E (EX5) Y'=4.0
FIG.15F (EX5) Y'=4.0

(M)
— d
----- SC
----- DM
— DS

-0.1   0.1
SPHERICAL SINE
ABERRATION CONDITION

-0.1   0.1
ASTIGMATISM

-10.0   10.0
DISTORTION %

FIG.15G (EX5) FNO=5.70
FIG.15H (EX5) Y'=4.0
FIG.15I (EX5) Y'=4.0

(T)
— d
----- SC
----- DM
— DS

-0.1   0.1
SPHERICAL SINE
ABERRATION CONDITION

-0.1   0.1
ASTIGMATISM

-10.0   10.0
DISTORTION %

FIG.16A (EX6) FNO=3.20
(W)
— d
----- SC
-0.1  0.1
SPHERICAL SINE
ABERRATION CONDITION

FIG.16B (EX6) Y'=4.0
----- DM
— DS
-0.1  0.1
ASTIGMATISM

FIG.16C (EX6) Y'=4.0
-10.0  10.0
DISTORTION %

FIG.16D (EX6) FNO=5.04
(M)
— d
----- SC
-0.1  0.1
SPHERICAL SINE
ABERRATION CONDITION

FIG.16E (EX6) Y'=4.0
----- DM
— DS
-0.1  0.1
ASTIGMATISM

FIG.16F (EX6) Y'=4.0
-10.0  10.0
DISTORTION %

FIG.16G (EX6) FNO=5.90
(T)
— d
----- SC
-0.1  0.1
SPHERICAL SINE
ABERRATION CONDITION

FIG.16H (EX6) Y'=4.0
----- DM
— DS
-0.1  0.1
ASTIGMATISM

FIG.16I (EX6) Y'=4.0
-10.0  10.0
DISTORTION %

FIG.17A (EX7)
FNO=3.08
(W)
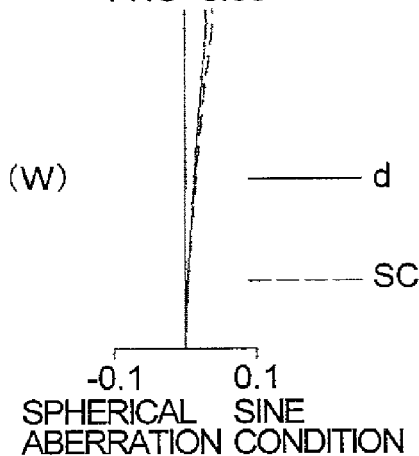
-0.1  0.1
SPHERICAL  SINE
ABERRATION  CONDITION
FIG.17B (EX7)
Y'=4.0
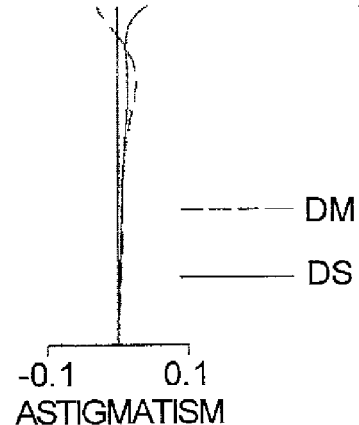
-0.1  0.1
ASTIGMATISM
FIG.17C (EX7)
Y'=4.0
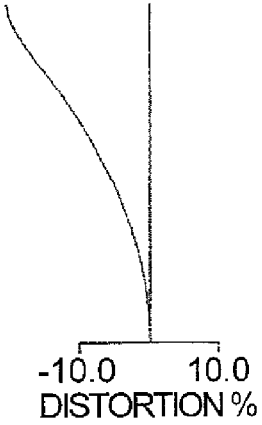
-10.0  10.0
DISTORTION %
FIG.17D (EX7)
FNO=5.10
(M)
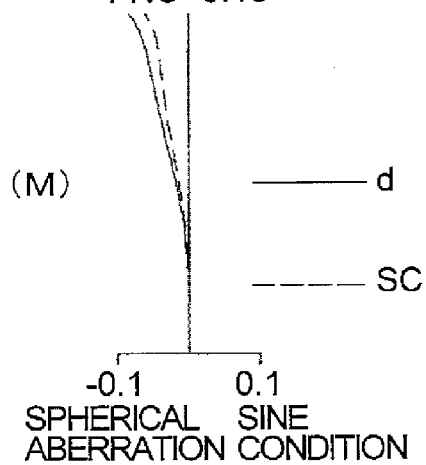
-0.1  0.1
SPHERICAL  SINE
ABERRATION  CONDITION
FIG.17E (EX7)
Y'=4.0
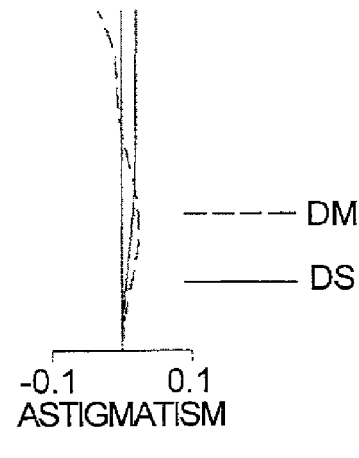
-0.1  0.1
ASTIGMATISM
FIG.17F (EX7)
Y'=4.0
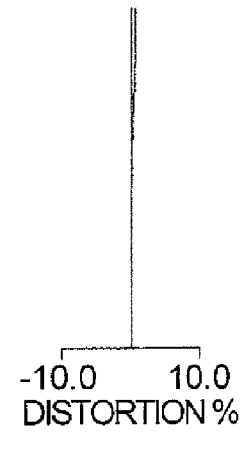
-10.0  10.0
DISTORTION %
FIG.17G (EX7)
FNO=6.66
(T)
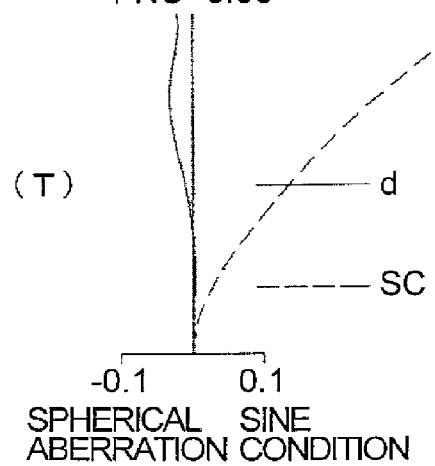
-0.1  0.1
SPHERICAL  SINE
ABERRATION  CONDITION
FIG.17H (EX7)
Y'=4.0
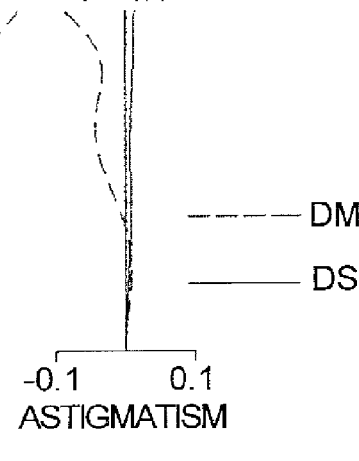
-0.1  0.1
ASTIGMATISM
FIG.17I (EX7)
Y'=4.0
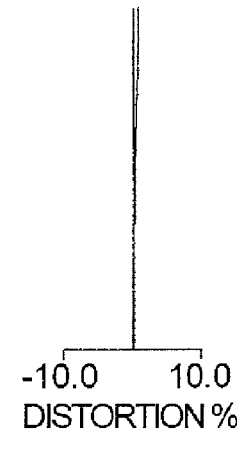
-10.0  10.0
DISTORTION %

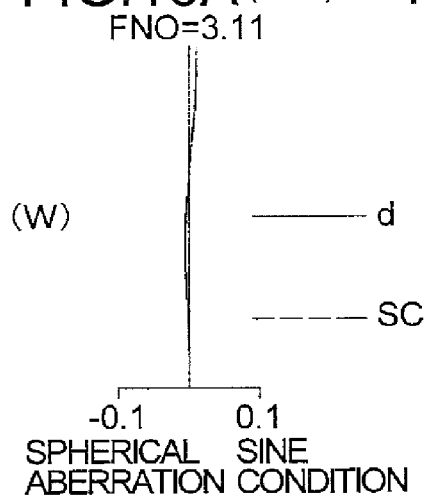
FIG.18A (EX8)
FNO=3.11
(W)
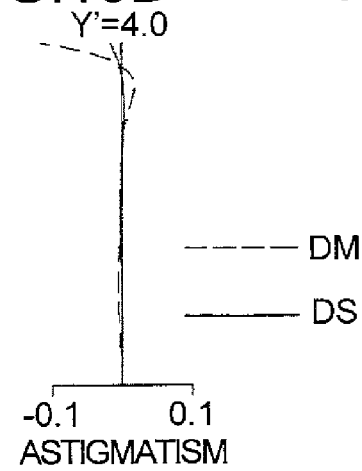
FIG.18B (EX8)
Y'=4.0
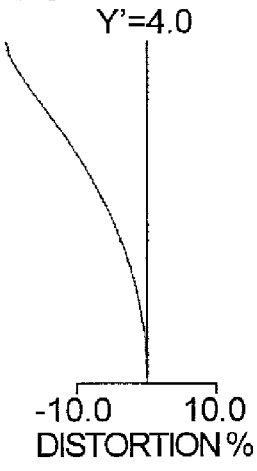
FIG.18C (EX8)
Y'=4.0
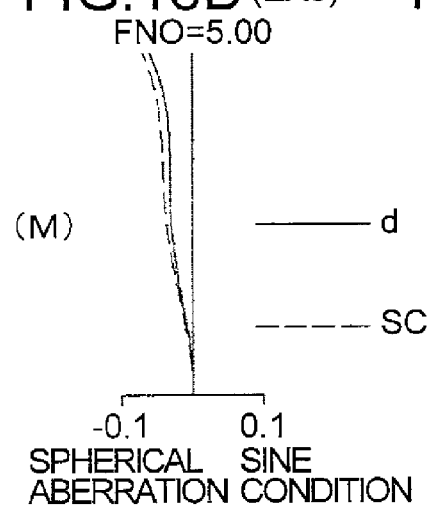
FIG.18D (EX8)
FNO=5.00
(M)
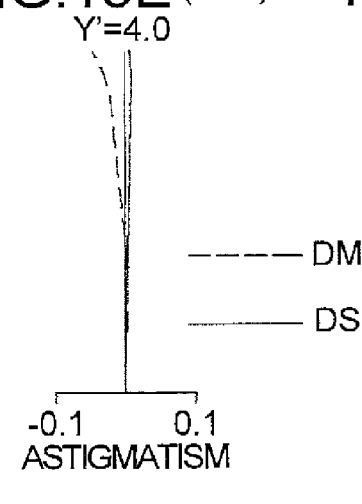
FIG.18E (EX8)
Y'=4.0
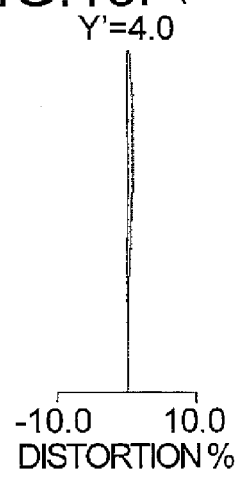
FIG.18F (EX8)
Y'=4.0
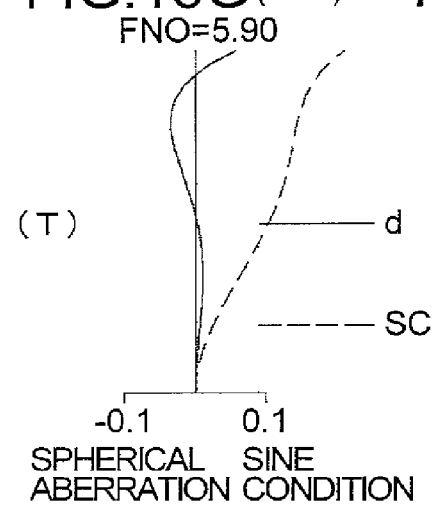
FIG.18G (EX8)
FNO=5.90
(T)
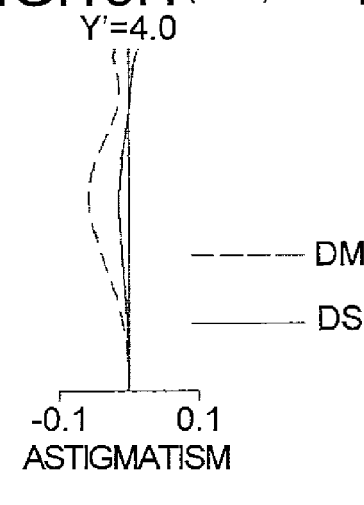
FIG.18H (EX8)
Y'=4.0
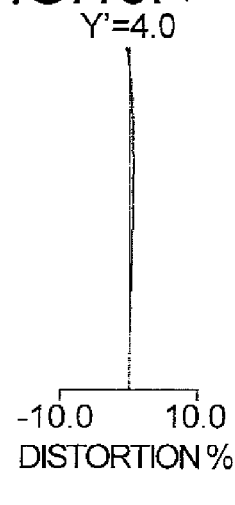
FIG.18I (EX8)
Y'=4.0

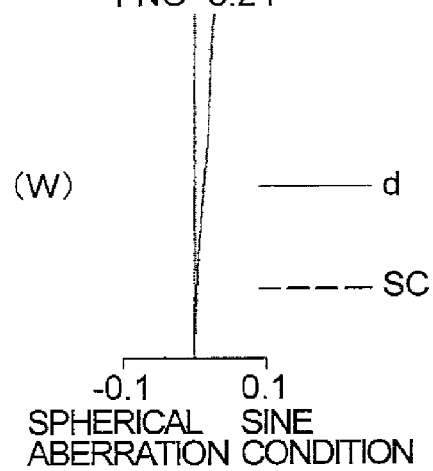
FIG.19A (EX9) FNO=3.24
(W)
— d
---- SC
SPHERICAL SINE ABERRATION CONDITION
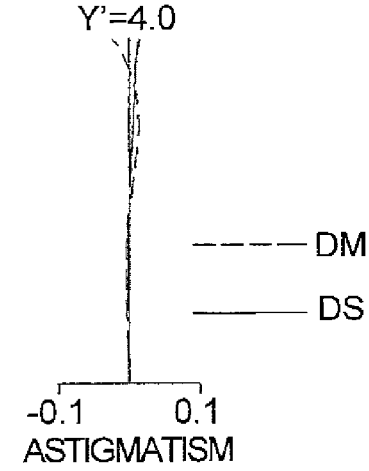
FIG.19B (EX9) Y'=4.0
---- DM
— DS
ASTIGMATISM
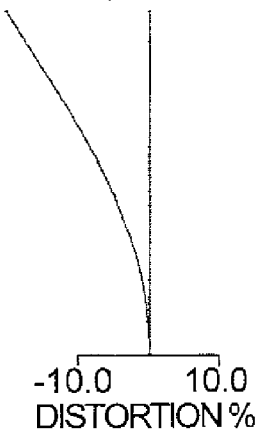
FIG.19C (EX9) Y'=4.0
DISTORTION %
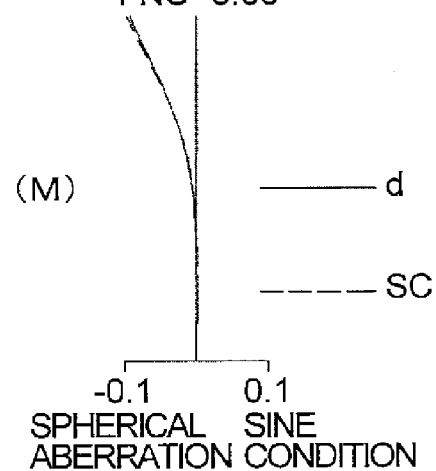
FIG.19D (EX9) FNO=5.08
(M)
— d
---- SC
SPHERICAL SINE ABERRATION CONDITION
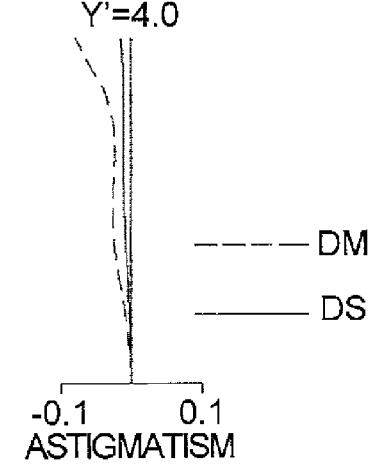
FIG.19E (EX9) Y'=4.0
---- DM
— DS
ASTIGMATISM
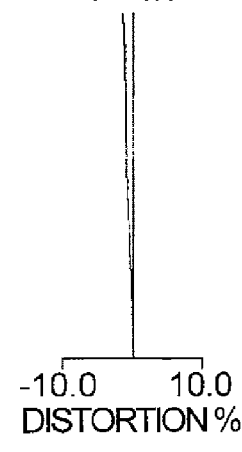
FIG.19F (EX9) Y'=4.0
DISTORTION %
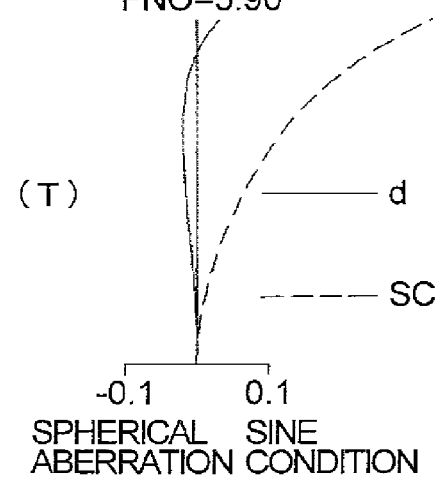
FIG.19G (EX9) FNO=5.90
(T)
— d
---- SC
SPHERICAL SINE ABERRATION CONDITION
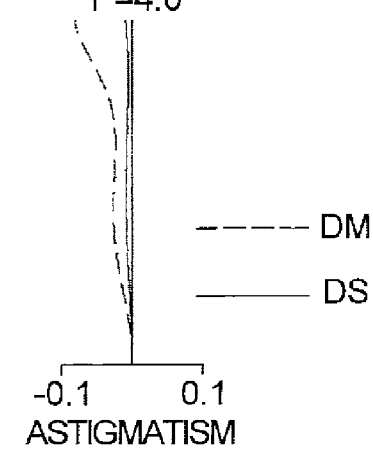
FIG.19H (EX9) Y'=4.0
---- DM
— DS
ASTIGMATISM
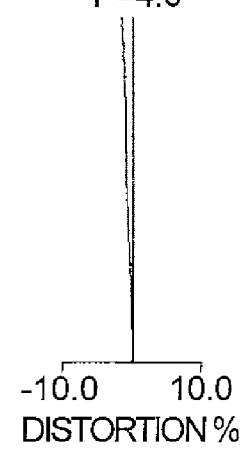
FIG.19I (EX9) Y'=4.0
DISTORTION %

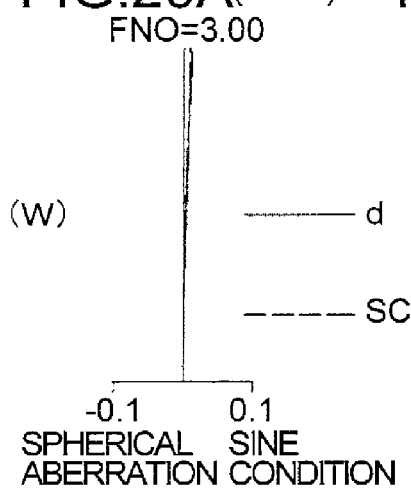
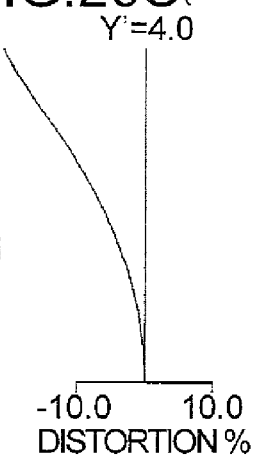
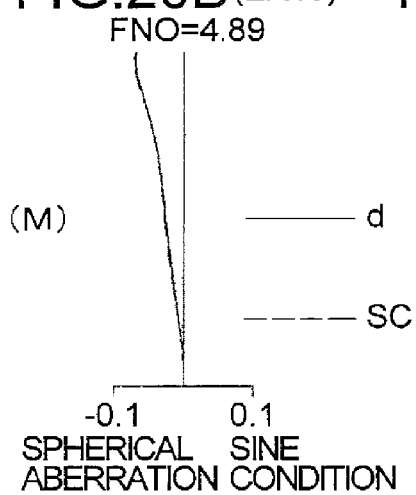
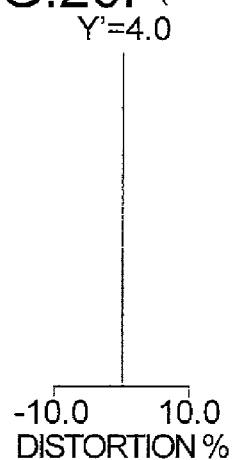
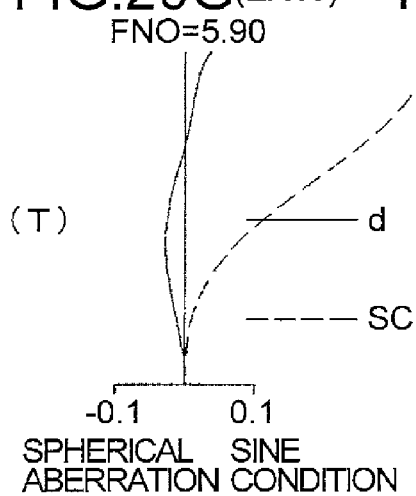
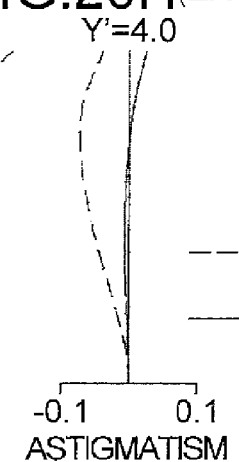
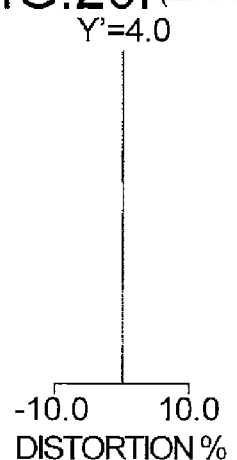

ZOOM LENS SYSTEM, IMAGING OPTICAL DEVICE, AND DIGITAL APPARATUS

This is the U.S. national stage of application No. PCT/JP2012/050663, filed on 16 Jan. 2012. Priority under 35 U.S.C. §119(a) and 35 U.S.C. §365(b) is claimed from Japanese Application Nos. 2011-011794, filed 24 Jan. 2011, and 2011-011807, filed 24 Jan. 2011, the disclosures of both of which are also incorporated herein by reference.

TECHNICAL FIELD

The invention relates to a zoom lens system, an imaging optical device, and a digital apparatus. More specifically, the present invention relates to a high variable power zoom lens system suitable for use in digital apparatuses equipped with an image input function, such as a digital camera that captures an image of a subject by using an image sensing device (for example, a solid-state image sensing device such as a CCD (charge coupled device) type image sensor or a CMOS (complementary metal-oxide semiconductor) type image sensor), an imaging optical device that outputs the image of the subject, which is captured by using the zoom lens system and the image sensing device, in the form of an electric signal, and a digital apparatus equipped with the image input function, such as a digital camera, incorporating the imaging optical device.

BACKGROUND ART

In recent years, along with the widespread use of personal computers, digital cameras capable of easily capturing images have been coming into widespread use. Along with it, there has been demand for more compact digital cameras, and this has naturally led to demand for more compact image sensing optical systems. On the other hand, a year-by-year increasing trend in number of pixels included in image sensing devices has led to demand for image sensing optical systems to have a high optical performance suitable for the increased number of pixels included in image sensing devices and demand for image sensing optical systems to be easy to fabricate to deal with a shorter product life cycle.

Further, various high variable power zoom lens systems having a zoom ratio of over 10× have been proposed as image sensing optical systems for use in video cameras and digital cameras. To meet the demand for more compact and thinner cameras, progress has been being made in size reduction and slimming down of even high variable power zoom lens systems having a zoom ratio of over 10×, by using a technique such as sliding of a lens group, and there is also an expectation for more compact and thinner high variable power zoom lens systems having a zoom ratio of over 20×. To meet these demands, zoom lens systems of various types have been conventionally proposed. For example, Patent Literature 1 listed below proposes a zoom lens system having a zoom ratio of approximately 18× including five lens groups of positive, negative, positive, positive, and positive lens groups, Patent Literature 2 listed below proposes a zoom lens system having a zoom ratio of approximately 20× including four lens groups of positive, negative, positive, and positive lens groups, and Patent Literature 3 listed below proposes a zoom lens system having a zoom ratio of approximately 40× including four lens groups of positive, negative, positive, and positive lens groups.

CITATION LIST

Patent Literature

Patent Literature 1: JP-A-2007-3554
Patent Literature 2: JP-A-2009-282439
Patent Literature 3: JP-A-2008-158062

SUMMARY OF INVENTION

Technical Problem

To achieve size reduction and slimming down of high variable power zoom lens systems, it is necessary to reduce a lens-system moving amount in zooming and/or a lens-system thickness in an optical axis direction. With the zoom lens systems proposed in Patent Literatures 1 and 2, however, each having a large optical total length and a large thickness in the optical axis direction, neither size reduction nor slimming down can be effectively achieved.

For zoom lens systems for digital cameras, angles of view (2ω) thereof have been being made wider to be as wide as about 75° to 80° at a wide angle side. In super high variable power zoom lens systems, however, since demand for higher variable power and demand for a wider angle of view are contradictory in some regards, no sufficiently effective effort has been made to achieve a wider angle of view. For example, the zoom lens systems proposed in Patent Literatures 1 and 2 each have a wide-angle-end angle of view of about 75° to 80°, and a zoom ratio of slightly smaller than 20×, and thus, neither the angle of view nor the variable power is sufficiently increased. The zoom lens system proposed in Patent Literature 3 has a zoom ratio of 40×, but its angle of view at the wide angle end is slightly smaller than 80°, which is not as wide as is desired.

The invention has been made in view of the inconveniences discussed above, and an object of the invention is to provide a high-performance zoom lens system that has high variable power, with a zoom ratio of over 18×, and yet is compact and thin, and an imaging optical device and a digital apparatus that incorporate such a zoom lens system. Another object of the invention is to provide a high-performance zoom lens system that has super high variable power, with a zoom ratio of over 30×, and yet has an angle of view at the wide angle side that is as wide as 88° to 90°, and an imaging optical device and a digital apparatus that incorporate such a zoom lens system.

Solution to Problem

To achieve the above objects, according to a first aspect of the invention, a zoom lens system includes, sequentially from an object side, a first lens group having a positive optical power, a second lens group having a negative optical power, a third lens group having a positive optical power, and a fourth lens group having a positive optical power. The zoom lens system achieves variable power by moving the first to fourth lens groups to change an inter-group distance between the lens groups. The third lens group includes two lens elements at least one of which has an aspherical surface. An object-side lens element of the third lens group is a cemented lens element including, sequentially from the object side, a positive lens element, a negative lens element, and a positive lens element.

According to a second aspect of the invention, in the zoom lens system according to the first aspect of the invention described above, the third lens group satisfies the following conditional formula (A1):

$$0.5 < f3/\sqrt{(fw \times ft)} < 0.9 \tag{A1}$$

where
f3 represents a focal length of the third lens group,
fw represents a focal length of a whole system at a wide angle end, and ft represents a focal length of the whole system at a telephoto end.

According to a third aspect of the invention, in the zoom lens system according to the first or second aspect of the invention described above, the third lens group satisfies the following conditional formula (A2):

$$0.3 < CR32/f3 < 0.65 \tag{A2}$$

where

CR32 represents a radius of curvature of an image-side surface of the negative lens element included in the cemented lens element, and f3 represents the focal length of the third lens group.

According to a fourth aspect of the invention, in the zoom lens system according to any one of the first to third aspects of the invention described above, of the positive lens elements included in the cemented lens element, one that is disposed closest to the object side has an aspherical surface, and a radius of curvature of the aspherical surface is larger than a reference radius of curvature by a larger value farther away from an optical axis.

According to a fifth aspect of the invention, in the zoom lens system according to any one of the first to fourth aspects of the invention described above, the first lens group includes, sequentially from the object side, a cemented lens element including a negative lens element and a positive lens element, and a positive single lens element, and the first lens group satisfies the following conditional formulas (A3) and (A4):

$$1.86 < Nd11 < 2 \tag{A3}$$

$$30 < \nu d11 < 40 \tag{A4}$$

where

Nd11 represents a refractive index of the negative lens element included in the first lens group with respect to a d-line, and vd11 represents an Abbe number of the negative lens element included in the first lens group with respect to the d-line.

According to a sixth aspect of the invention, in the zoom lens system according to any one of the first to fifth aspects of the invention described above, the following conditional formula (A5) is satisfied:

$$0.3 < \beta 4t/\beta 4w < 0.7 \tag{A5}$$

where

β4t represents a lateral magnification of the fourth lens group at the telephoto end, and β4w represents a lateral magnification of the fourth lens group at the wide angle end.

According to a seventh aspect of the invention, in the zoom lens system according to any one of the first to sixth aspects of the invention described above, the following conditional formula (A6) is satisfied:

$$-10 < \{(ywmax - Ymax)/Ymax\} \times 100 < -25 \tag{A6}$$

where ywmax represents a maximum real image height at the wide angle end, and

Ymax represents a maximum ideal image height.

According to an eighth aspect of the invention, a zoom lens system includes, sequentially from an object side, a first lens group having a positive optical power, a second lens group having a negative optical power, a third lens group having a positive optical power, and a fourth lens group having a positive optical power. The zoom lens system achieves variable power by moving the first to fourth lens groups to change an inter-group distance between the lens groups, and the zoom lens system satisfies the following conditional formulas (B1) to (B3):

$$7 < \beta 2t/\beta 2w < 10 \tag{B1}$$

$$5 < \beta 3t/\beta 3w < 12 \tag{B2}$$

$$0.7 < (\beta 2t/\beta 2w)/(\beta 3t/\beta 3w) < 1.65 \tag{B3}$$

where

β2t represents a lateral magnification of the second lens group at a telephoto end, β2w represents a lateral magnification of the second lens group at a wide angle end, β3t represents a lateral magnification of the third lens group at the telephoto end, and β3w represents a lateral magnification of the third lens group at the wide angle end.

According to a ninth aspect of the invention, in the zoom lens system according to the eighth aspect of the invention described above, the first lens group includes, sequentially from the object side, a cemented lens element including a negative lens element and a positive lens element, and a positive single lens element, and the following conditional formulas (B4) and (B5) are satisfied:

$$1.86 < Nd11 < 2 \tag{B4}$$

$$30 < \nu d11 < 40 \tag{B5}$$

where

Nd11 represents a refractive index of the negative lens element included in the first lens group with respect to a d-line, and vd11 represents an Abbe number of the negative lens element included in the first lens group with respect to the d-line.

According to a tenth aspect of the invention, in the zoom lens system according to the eighth or ninth aspect of the invention described above, the following conditional formula (B6) is satisfied:

$$0.3 < \beta 4t/\beta 4w < 0.7 \tag{B6}$$

where

β4t represents a lateral magnification of the fourth lens group at the telephoto end, and β4w represents a lateral magnification of the fourth lens group at the wide angle end.

According to an eleventh aspect of the invention, in the zoom lens system according to any one of the eighth to tenth aspects of the invention described above, the following conditional formula (B7) is satisfied:

$$-10 < \{(ywmax - Ymax)/Ymax\} \times 100 < -25 \tag{B7}$$

where ywmax represents a maximum real image height at the wide angle end, and

Ymax represents a maximum ideal image height.

According to a twelfth aspect of the invention, in the zoom lens system according to any one of the eighth to eleventh aspects of the invention described above, in the third lens group, a surface that is located closest to the object side is formed of an aspherical surface.

According to a thirteenth aspect of the invention, in the zoom lens system according to any one of the eighth to twelfth aspects of the invention described above, the second lens group includes, sequentially from the object side, a negative meniscus lens element having a convex surface facing toward the object side, a cemented lens element including a biconcave negative lens element and a biconvex positive lens element, and a negative meniscus lens element having a convex surface facing toward an image side.

According to a fourteenth aspect of the invention, in the zoom lens system according to any one of the eighth to thirteenth aspects of the invention described above, the following conditional formula (B8) is satisfied:

$$-0.3 < m3/TLt < -0.2 \quad (B8)$$

where m3 represents an absolute amount of movement of the third lens group in zooming from the wide angle end to the telephoto end (a minus sign indicates movement to the object side), and TLt represents an optical total length at the telephoto end.

According to a fifteenth aspect of the invention, in the zoom lens system according to any one of the eighth to fourteenth aspects of the invention described above, the following conditional formula (B9) is satisfied:

$$-0.25 < m4/TLt < -0.1 \quad (B9)$$

where m4 represents an absolute amount of movement of the fourth lens group in zooming from the wide angle end to the telephoto end (a minus sign indicates movement to the object side), and TLt represents the optical total length at the telephoto end.

According to a sixteenth aspect of the invention, an imaging optical device includes a zoom lens system of any one of the first to fifteenth aspects of the invention described above, and an image sensing device that converts an optical image formed on a light receiving surface into an electric signal. The zoom lens system is arranged such that an optical image of a subject is formed on the light receiving surface of the image sensing device.

According to a seventeenth aspect of the invention, a digital apparatus includes the imaging optical device of the sixteenth aspect of the invention described above so as to be additionally provided with at least one of a function of shooting a still image of the subject and a function of shooting a moving image of the subject.

According to an eighteenth aspect of the invention, the digital apparatus according to the seventeenth aspect of the invention described above is one of a digital camera, a surveillance camera, and a portable terminal unit equipped with an image input function.

Advantageous Effects of Invention

In the zoom lens system according to the invention, the third lens group includes two lens elements, and at least one of the two lens elements has an aspherical surface; an object-side one of the two lens elements in the third lens group is a cemented lens element including, sequentially from the object side, a positive lens element, a negative lens element, and a positive lens element. With this construction, it is possible to achieve size reduction, slimming down, and higher performance by reducing the lens movement amount in zooming and the thickness in an optical axis direction, while increasing the optical power to be exerted by the third lens group to obtain such a high variable power ratio that the zoom ratio is over 18x. Thus, it is possible to achieve an imaging optical device provided with a compact, high-performance zoom lens system of high variable power. And, by using the imaging optical device according to the invention in a digital apparatus such as a digital camera, it is possible to provide the digital apparatus additionally with a high-performance image input function in a compact manner.

The zoom lens system according to the invention, which is a zoom lens system including four lens groups which are, sequentially from the object side, positive, negative, positive, and positive lens groups, is constructed such that shares of responsibility assigned to the second and third lens groups for achieving variable power satisfy a predetermined condition, and this makes it possible to increase the angle of view at the wide angle side to be as wide as 88° to 90° and achieve high optical performance, while achieving such super high variable power that the zoom ratio is over 30x. Thus, it is possible to achieve an imaging optical device provided with a compact, high-performance zoom lens system having a wide angle of view and capable of achieving super high variable power. And, by using the imaging optical device according to the invention in a digital apparatus such as a digital camera, it is possible to provide the digital apparatus additionally with a high-performance image input function in a compact manner.

BRIEF DESCRIPTION OF DRAWINGS

FIGS. 11A to 11I are aberration diagrams of Example 1;
FIGS. 12A to 12I are aberration diagrams of Example 2;
FIGS. 13A to 13I are aberration diagrams of Example 3;
FIGS. 14A to 14I are aberration diagrams of Example 4;
FIGS. 15A to 15I are aberration diagrams of Example 5;
FIGS. 16A to 16I are aberration diagrams of Example 6;
FIGS. 17A to 17I are aberration diagrams of Example 7;
FIGS. 18A to 18I are aberration diagrams of Example 8;
FIGS. 19A to 19I are aberration diagrams of Example 9;
FIGS. 20A to 20I are aberration diagrams of Example 10.

DESCRIPTION OF EMBODIMENTS

Figure 1:
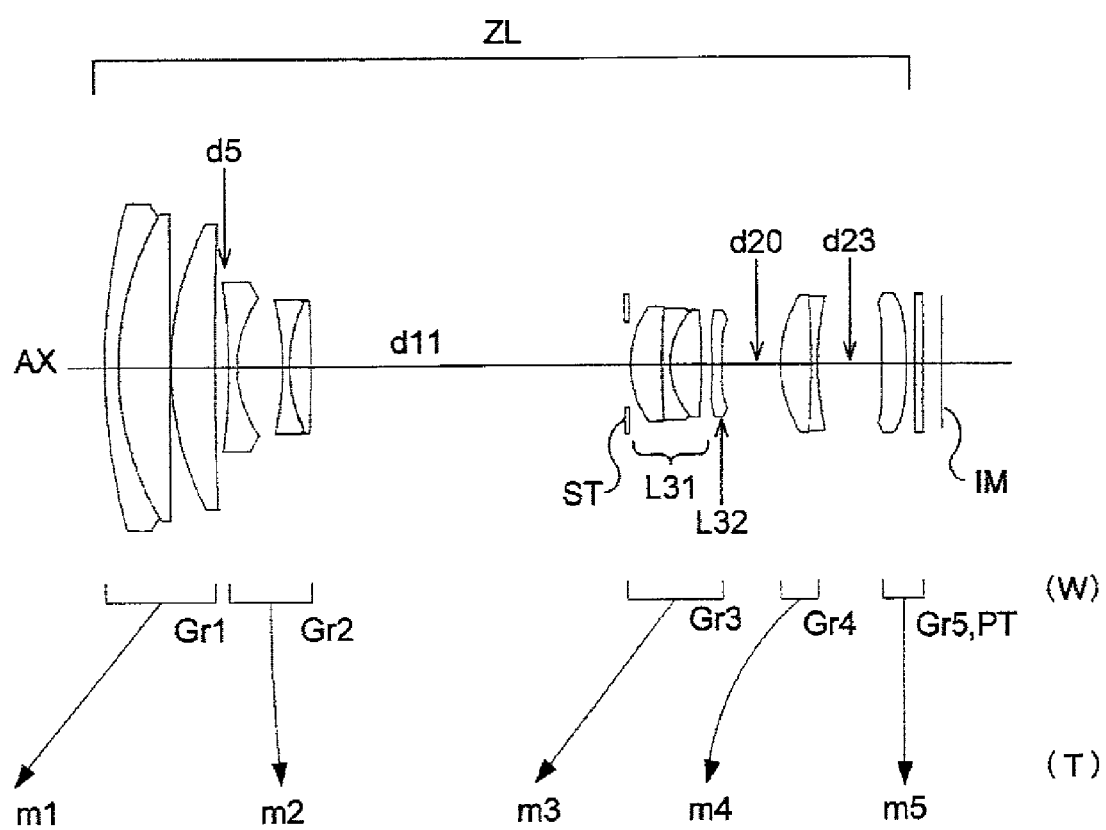
FIG. 1 is a lens construction diagram of a first embodiment (Example 1)
Figure 2:
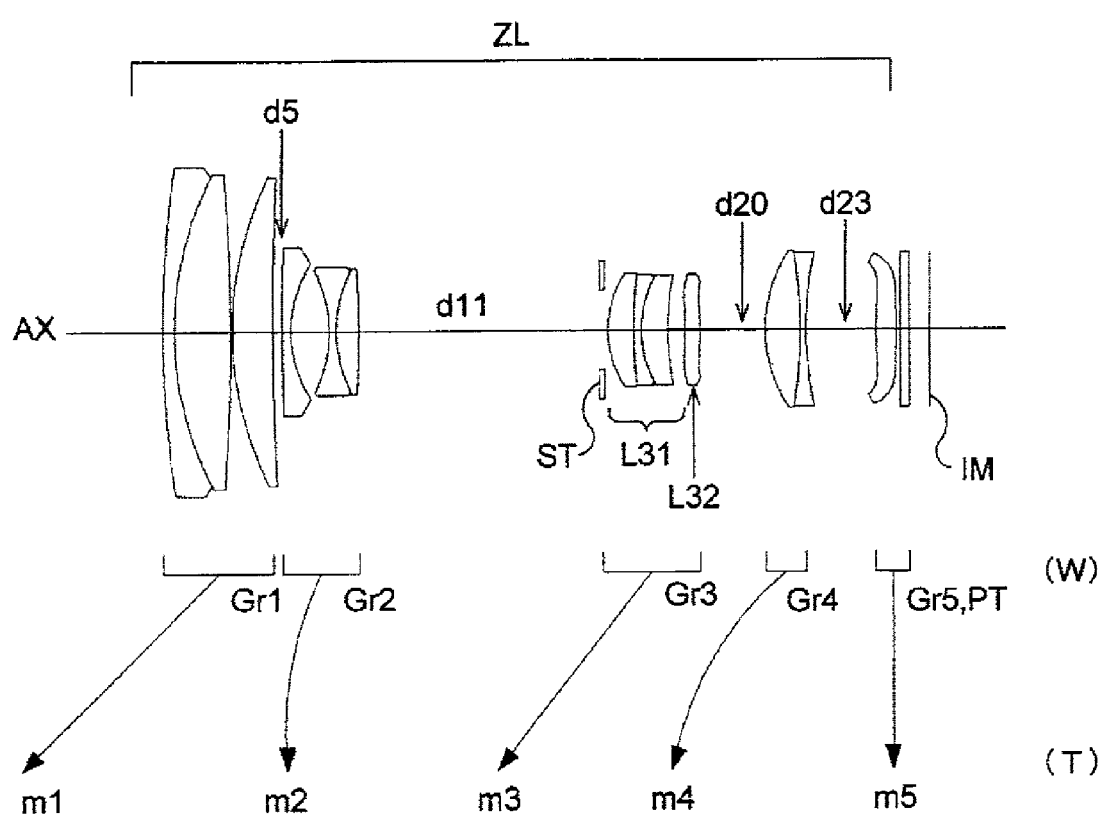
FIG. 2 is a lens construction diagram of a second embodiment (Example 2)
Figure 3:
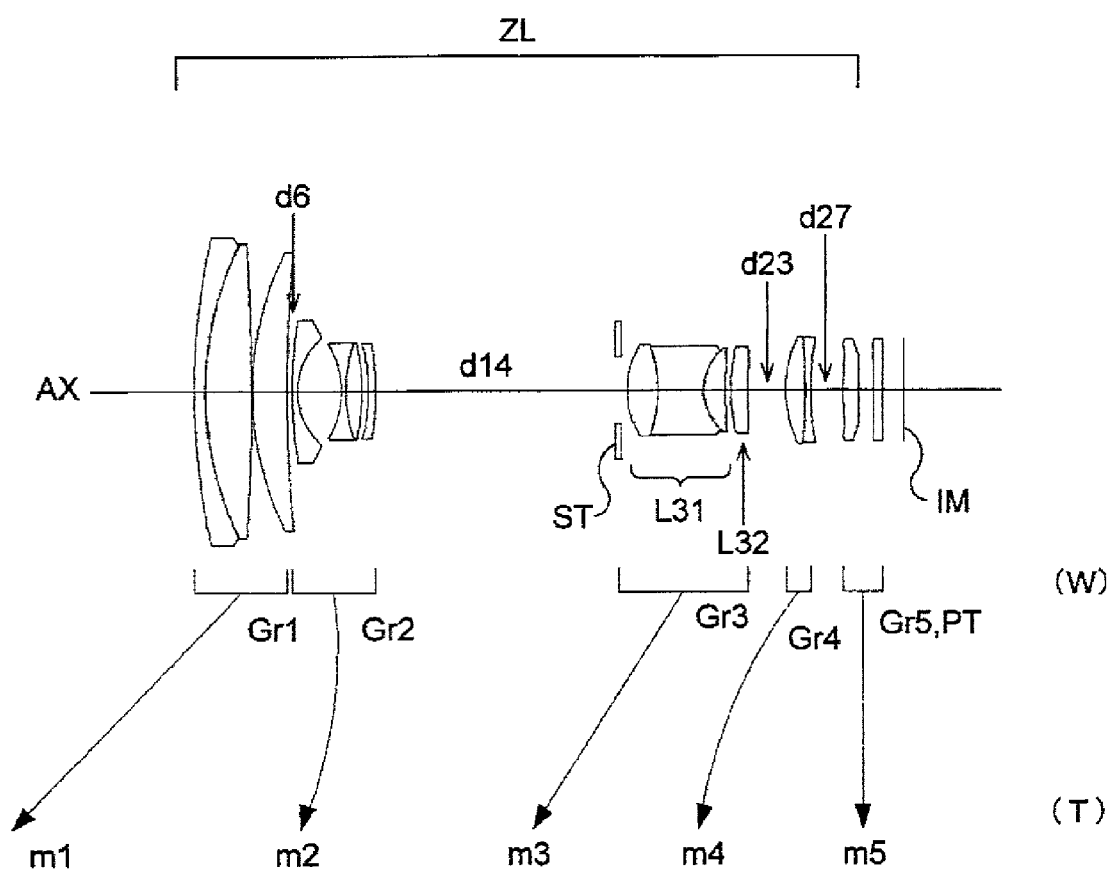
FIG. 3 is a lens construction diagram of a third embodiment (Example 3)
Figure 4:
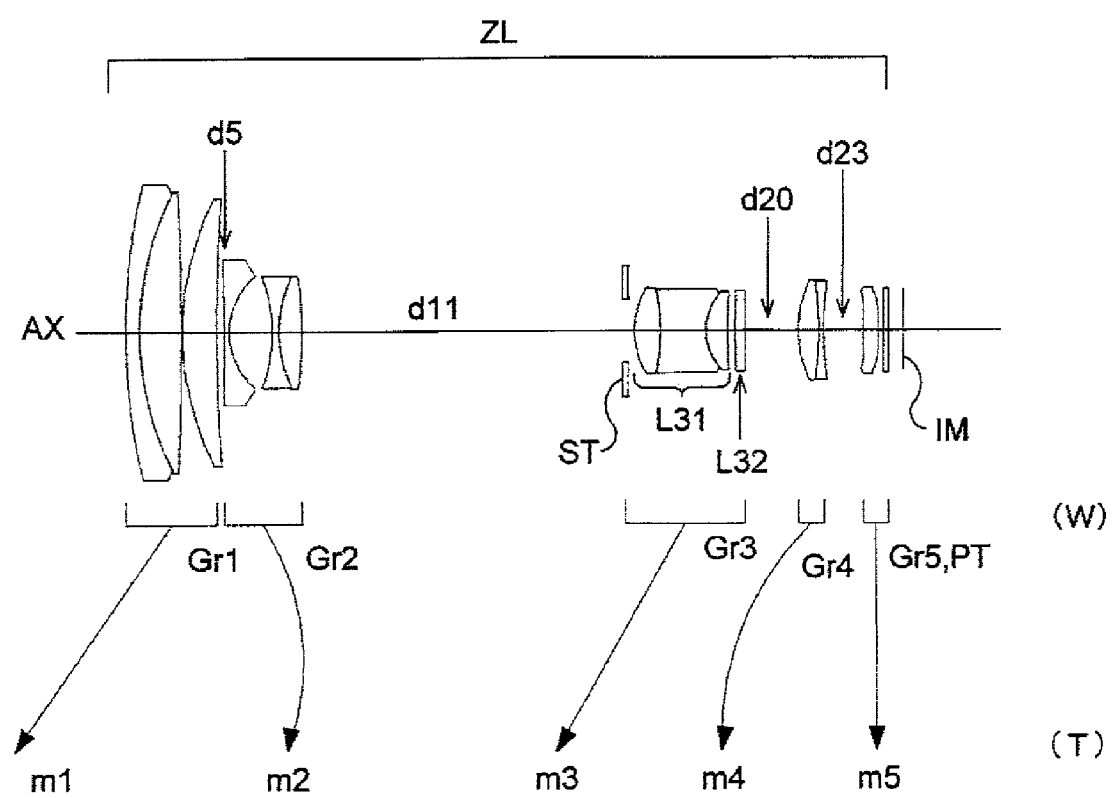
FIG. 4 is a lens construction diagram of a fourth embodiment (Example 4)
Figure 5:
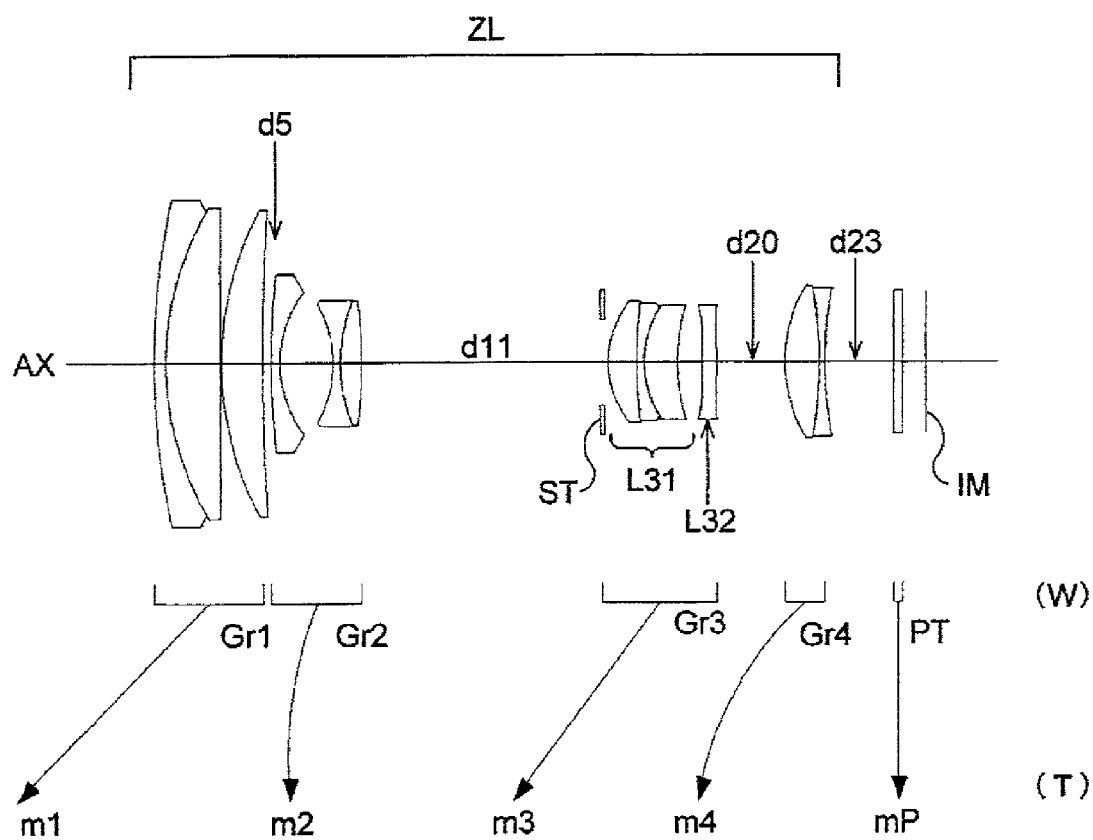
FIG. 5 is a lens construction diagram of a fifth embodiment (Example 5)
Figure 6:
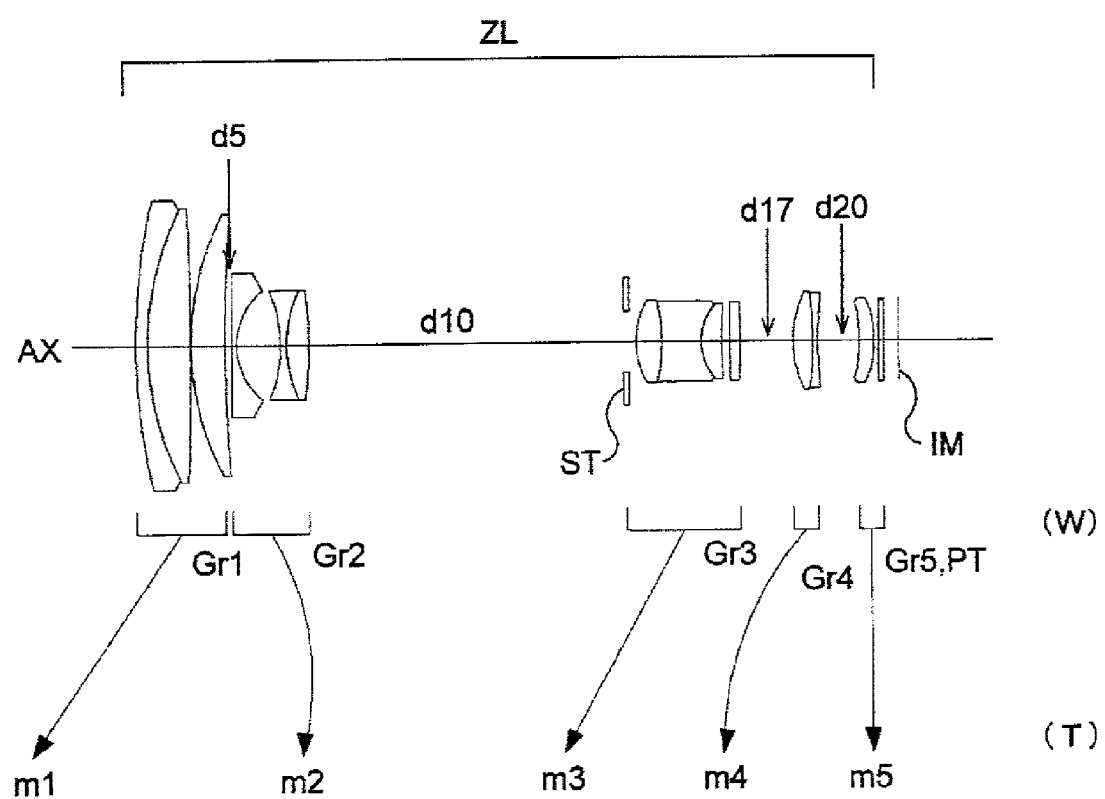
FIG. 6 is a lens construction diagram of a sixth embodiment (Example 6)
Figure 7:
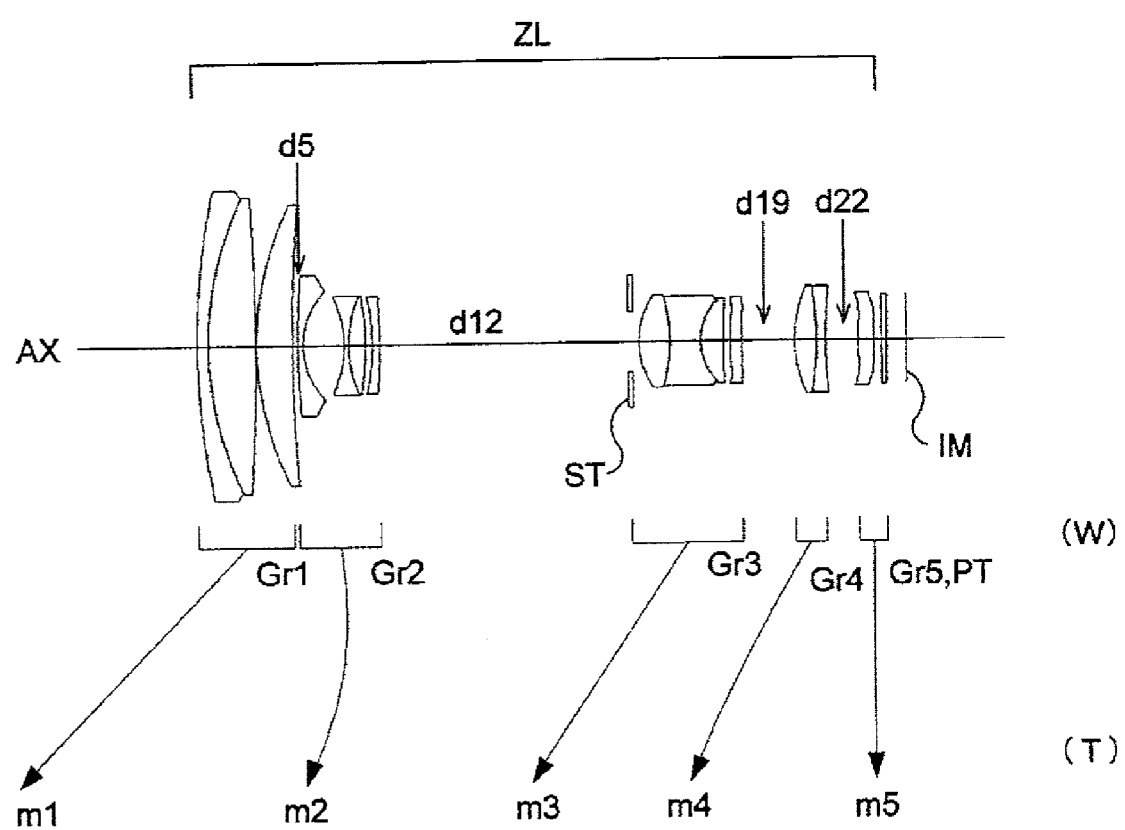
FIG. 7 is a lens construction diagram of a seventh embodiment (Example 7)
Figure 8:
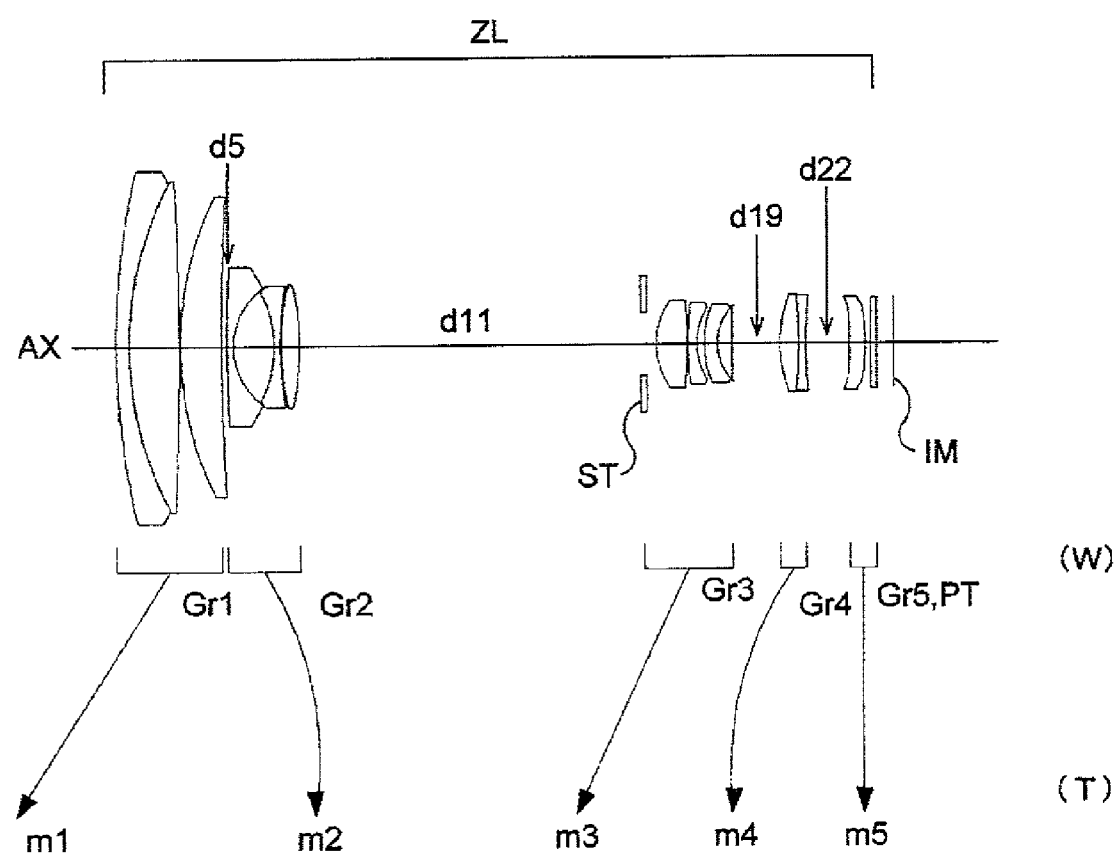
FIG. 8 is a lens construction diagram of an eighth embodiment (Example 8)
Figure 9:
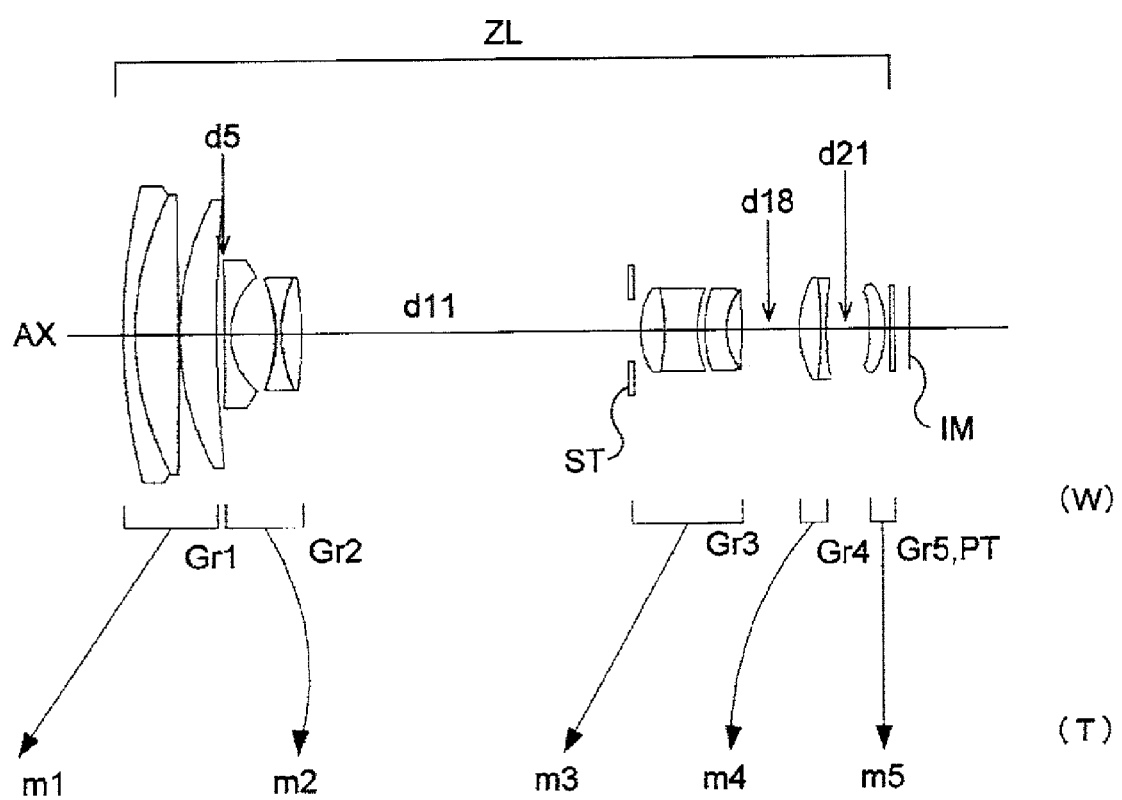
FIG. 9 is a lens construction diagram of a ninth embodiment (Example 9)
Figure 10:
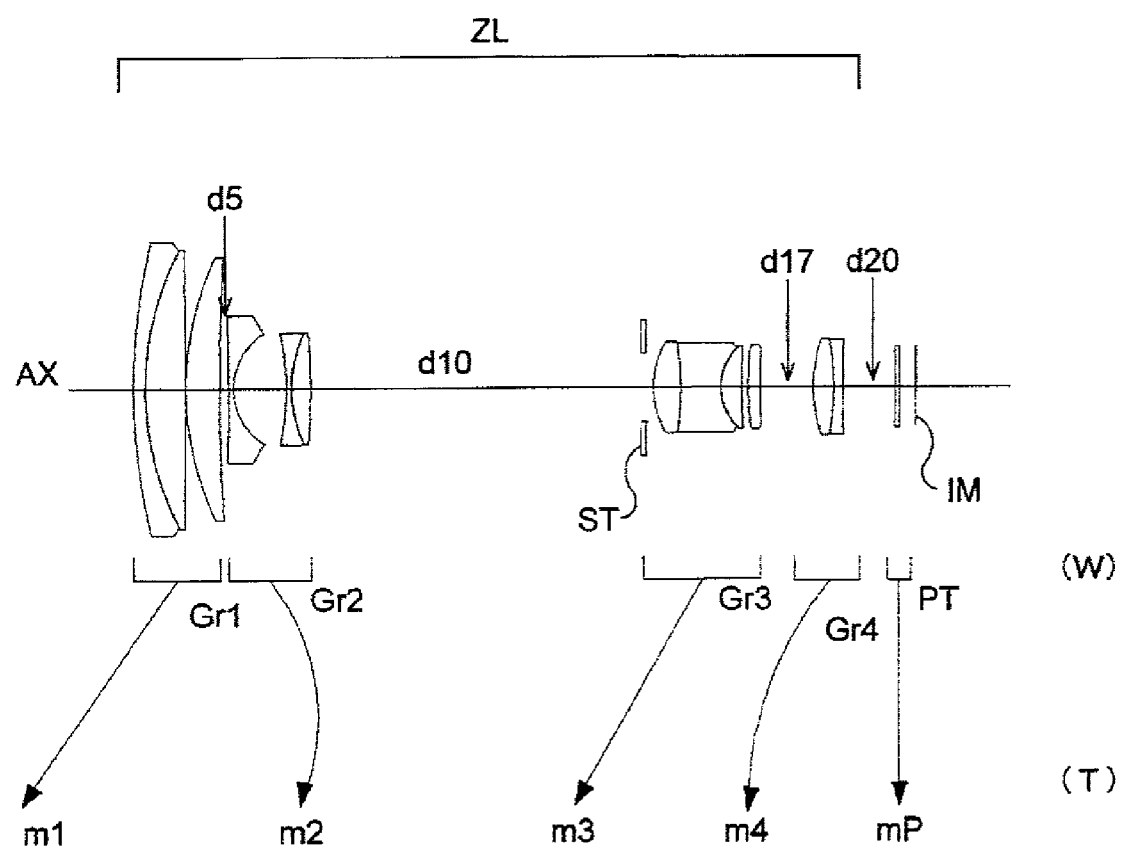
FIG. 10 is a lens construction diagram of a tenth embodiment (Example 10)

Hereinafter, descriptions will be given of zoom lens systems, imaging optical devices, and digital apparatuses according to the invention, by classifying them into two types. A zoom lens system of a first type according to the invention includes, sequentially from the object side, a first lens group having a positive optical power, a second lens group having a negative optical power, a third lens group having a positive optical power, and a fourth lens group having a positive optical power. The zoom lens system achieves variable power by moving the first to fourth lens groups to change an inter-group distance between the lens groups. The third lens group includes two lens elements, at least one of which has an aspherical surface, and an object-side lens element of the third lens group is a cemented lens element including, sequentially from the object side, a positive lens element, a negative lens element, and a positive lens element (optical power is a quantity defined as a reciprocal of a focal length).

A compact but high variable power zoom lens system is achieved typically by enhancing the optical power of each lens group included in the zoom lens system, but here, there is adopted a construction that allows enhancement of the optical power particularly of the third lens group. In a conventional zoom type including four positive, negative, positive, and positive lens groups, a main share of responsibility for achieving variable power is assigned to the second lens group, and in a case of achieving high variable power as well, the optical power of the second lens group is enhanced to achieve compactness and high variable power. In contrast, in the zoom lens system according to the invention, high variable power is achieved by assigning to the third lens group, which conventionally does not bear relatively much responsibility for achieving variable power, a larger share of responsibility for achieving variable power. In this case, it can be expected that the enhanced optical power of the third lens group will lead to excessively strong sensitivity to errors, which will increase a spherical aberration error between lens blocks, making the zoom lens system difficult to produce. To prevent this inconvenience, the lens blocks having strong sensitivity to errors are cemented together so that production difficulty is reduced, and in regard to design, more freedom is given to curvature, to make it possible for the third lens group to perform preferable aberration correction by making use of high-order aberration generated at the cemented surfaces.

With this characteristic construction, it is possible to achieve a high-performance zoom lens system that, despite having high variable power, with a zoom ratio of over 18×, is made compact and thin by reducing the lens movement amount in zooming and the lens thickness in an optical axis direction, and an imaging optical device provided therewith. Furthermore, since the imaging optical device is made light weight and compact, by using the imaging optical device in a digital apparatus such as a digital camera or a portable information terminal unit, it is possible to provide the digital apparatus additionally with a high-performance image input function in a light-weight and compact manner. Thus, the characteristic construction contributes to, for example, reduction in size and cost of, and improvement in performance and functionality of, digital apparatuses. Hereinafter, descriptions will be given of conditions and the like for obtaining these advantages in a well-balanced manner, and for achieving higher optical performance, further compactness, and the like.

In view of achieving a high variable power zoom lens system that is compact and yet holds high optical performance, a zoom ratio of 18× to 38× is preferable. An attempt to obtain a high zoom ratio of approximately 18× to 38× usually makes it difficult to achieve size reduction and improvement in performance of zoom lens systems, but according to the above-described characteristic construction regarding the cemented lens element of the third lens group and the like, it is possible to obtain a high zoom ratio while achieving size reduction and improvement in performance, and so on. This makes it possible to achieve high variable power while achieving both compactness and high performance It is preferable that the third lens group satisfy the following conditional formula (A1):

$$0.5 < f3/\sqrt{(fw \times ft)} < 0.9 \tag{A1}$$

where
f3 represents a focal length of the third lens group,
fw represents a focal length of a whole system at a wide angle end, and
ft represents a focal length of the whole system at a telephoto end.

The conditional formula (A1) defines a preferable focal length of the third lens group, and when the conditional formula (A1) is satisfied, the third lens group has a comparatively strong refractive power. If an upper limit of the conditional formula (A1) is exceeded, the focal length of the third lens group becomes too long, and thus the share of responsibility for achieving variable power assigned to the third lens group decreases, which is not desirable in view of achieving compactness. Besides, in order to effectively achieve size reduction despite the long focal length of the third lens group, it is necessary for the second lens group to bear a larger share of responsibility for achieving variable power. If the refractive power of the second lens group is increased to meet such a requirement, it might invite increase in astigmatism and in field curvature. On the other hand, if a lower limit of the conditional formula (A1) is fallen short of, the focal length of the third lens group becomes too short, and this makes it difficult to correct aberration, particularly spherical aberration, generated in the third lens group within the third lens group.

It is preferable that the third lens group satisfy the following conditional formula (A2):

$$0.3 < CR32/f3 < 0.65 \tag{A2}$$

where
CR32 represents a radius of curvature of an image-side surface of the negative lens element included in the cemented lens element, and
f3 represents the focal length of the third lens group.

The conditional formula (A2) relates to the negative lens element included in the cemented lens element in the third lens group, and the conditional formula (A2) defines a preferable radius of curvature of the image-side surface of the negative lens element. The image-side surface of the negative lens element has a curvature such that the surface faces toward the image side as a strongly concave surface, and by generating high-order aberration at the strongly concave surface that satisfies the conditional formula (A2), it is possible to perform preferable aberration correction within the third lens group in a preferable manner. This is particularly effective in correcting coma aberration. The amount of coma aberration tends to be larger where the conditional formula (A2) is not satisfied, and specifically, if a lower limit of the conditional formula (A2) is fallen short of, it becomes difficult to correct coma aberration, while it becomes difficult to correct astigmatism if an upper limit of the conditional formula (A2) is exceeded.

As already mentioned, the third lens group has a cemented lens element including positive, negative, and positive lens elements, and it is preferable that one of the positive lens elements that is disposed closest to the object side have an aspherical surface, and that the radius of curvature of the aspherical surface is larger than a reference radius of curvature by a larger value farther away from the optical axis. The third lens group has a strong positive refractive power, and the major positive refractive power is generated by the above-mentioned positive lens element that is disposed closest to the object side. In this construction, strong positive optical power causes a strong undercorrected spherical aberration to be generated, but such spherical aberration can be corrected by the aspherical surface whose radius of curvature is larger than the reference radius of curvature by a larger value farther away from the optical axis.

It is preferable that the first lens group include, sequentially from the object side, a cemented lens element including a negative lens element and a positive lens element, and a positive single lens element, and that the first lens group satisfy the following conditional formulas (A3) and (A4):

$$1.86 < Nd11 < 2 \tag{A3}$$

$$30 < vd11 < 40 \tag{A4}$$

where

Nd11 represents a refractive index of the negative lens element included in the first lens group with respect to a d-line, and vd11 represents an Abbe number of the negative lens element included in the first lens group with respect to the d-line.

In a high variable power zoom lens system, correction of chromatic aberration at the telephoto side is difficult, and it is particularly necessary to reduce chromatic aberration generated in the first lens group. In particular, second spectrum increases, and thus, typically, a lens element having an anomalous dispersion characteristic is often used as a positive lens element of the first lens group to achieve the reduction. Also, the negative lens element needs to have a strong refractive power to achieve a compact zoom lens system, but a strong refractive power leads to a large curvature, allowing strong coma aberration and/or strong astigmatism to be generated. Thus, it is necessary that the negative lens element have a high refractive index so as not to invite increase in the curvature, but unfortunately, glass materials having a refractive index of over 1.85 are usually characterized by having an anomalous dispersion characteristic on the plus side, and thus, even if an anomalous dispersion lens element is used as a positive lens element, it is difficult to correct secondary spectrum.

By selecting a glass material that satisfies the conditional formulas (A3) and (A4), it is possible to select a glass material that has a low anomalous dispersion characteristic and a strong refractive power. If a lower limit of the conditional formula (A3) is fallen short of, the refractive power becomes too weak, and this leads to an undesirably large optical system. An attempt to maintain the optical power at the same level will lead to a large curvature, causing large spherical aberration that is difficult to correct. If an upper limit of the conditional formula (A3) is exceeded, the refractive power of the surface becomes strong, and in particular, sensitivity to manufacturing errors of aspherical waves becomes strong, making it disadvantageously difficult to produce the zoom lens system. If an upper limit of the conditional formula (A4) is exceeded, dispersion values become too large, and it becomes difficult to correct chromatic aberration. If a lower limit of the conditional formula (A4) is fallen short of, it means that a glass material having a high anomalous dispersion characteristic is selected, and thus it is difficult to correct chromatic aberration.

It is preferable that the present zoom lens system adopt one anomalous dispersion lens element as the positive lens element of the first lens group, so as to reduce secondary spectrum. In an area, to which the present optical system belongs, where an optical system at the telephoto end functions as a so-called super-telephoto lens system, correction of secondary spectrum is a problem to be dealt with, and in some cases, a plurality of anomalous dispersion lens elements are used, or, a lens element having a very high anomalous dispersion characteristic, such as a fluorite lens element, is used. The point of this correction is the correction of chromatic aberration on the negative lens element side, and selected as the negative lens element is one that is made of a glass material belonging to an area of small Abbe numbers. With a typically used optical glass material, which has a high positive anomalous dispersion, if it has a small Abbe number, the effect of the anomalous dispersion used in the positive lens element is cancelled, so that the secondary spectrum is corrected only insufficiently. Thus, it can be said to be preferable that the conditional formulas (A3) and (A4) be satisfied.

It is preferable that the following conditional formula (A5) be satisfied:

$$0.3 < \beta 4t/\beta 4w < 0.7 \tag{A5}$$

where $\beta 4t$ represents a lateral magnification of the fourth lens group at the telephoto end, and $\beta 4w$ represents a lateral magnification of the fourth lens group at the wide angle end.

The conditional formula (A5) defines a preferable lateral magnification ratio of the fourth lens group between at the telephoto end and at the wide angle end, and the optical total length at the telephoto side is able to be effectively reduced by satisfying the conditional formula (A5). The present optical system, having the small optical total length at the telephoto side despite having a zoom ratio of over 18×, contributes to achieving a compact lens barrel and a compact camera. If simply the optical total length at the telephoto side is reduced, it leads to total increase in the optical power of each of the lens groups, which makes it difficult to correct aberration; in contrast, if the lateral magnification of the fourth lens group at the telephoto end is made comparatively small so as to satisfy the conditional formula (A5), it is possible to reduce the optical total length.

If an upper limit of the conditional formula (A5) is exceeded, a combined focal length of the first to third lens groups becomes short, which makes it difficult to correct aberration, above all, field curvature. If a lower limit of the conditional formula (A5) is fallen short of, the optical total length increases, which is not preferable from the viewpoint of achieving compactness. Furthermore, if the lower limit of the conditional formula (A5) is fallen short of, need arises to increase the refractive power of the second lens group, which may in turn increase astigmatism, and need arises to increase the refractive power of the third lens group, which may in turn increase spherical aberration.

It is preferable that the following conditional formula (A6) be satisfied:

$$-10 < \{(ywmax - Ymax)/Ymax\} \times 100 < -25 \tag{A6}$$

where ywmax represents a maximum real image height at the wide angle end, and

Ymax represents a maximum ideal image height.

The conditional formula (A6) defines a distortion ratio at the wide angle end.

Allowing distortion in the range of the conditional formula (A6) to be generated at the wide angle end is effective particularly to reduce an external diameter of the first lens group. The generated distortion is able to be corrected by electronic means such that the distortion ratio is reduced to a level that does not cause any trouble. If an upper limit of the conditional formula (A6) is exceeded, the distortion ratio becomes so large that it causes an excessively large interpolation error in correcting the distortion by using the electronic means, which unpreferably leads to degradation of performance. If the lower limit of the conditional formula (A6) is fallen short of, the ratio of the generated distortion is low, which leads to a larger external diameter of the first lens group, and as a result, the entire size of a camera incorporating the optical system becomes larger, which is not preferable in terms of compactness.

A construction where a stop is positioned on the object side of the third lens group in the zoom type including the positive, negative, positive, and positive lens groups is strongly asymmetric at the wide angle end, and this leads to generation of a strong negative distortion. The distortion is generated mainly in the second lens group, and it is to be corrected mainly in the first and third lens groups. By generating a correcting effect in a lens element of the third lens group that is located closest to the image, it is possible to correct the distortion in the third lens group, although not very much effectively, because the third lens group is located close to a stop surface. In such a construction, spherical aberration is generated, but by correcting the distortion to be within the range defined by the conditional formula (A6), it becomes possible to preferably correct the spherical aberration within the third lens group.

Next, a description will be given of a zoom lens system of a second type according to the invention. The zoom lens system of the second type according to the invention includes, sequentially from the object side, a first lens group having a positive optical power, a second lens group having a negative optical power, a third lens group having a positive optical power, and a fourth lens group having a positive optical power. The zoom lens system achieves variable power by moving the first to fourth lens groups to change an inter-group distance between the lens groups, and the zoom lens system satisfies the following conditional formulas (B1) to (B3) (optical power is an amount defined by the inverse of a focal length):

$$7 < \beta 2t/\beta 2w < 10 \tag{B1}$$

$$5 < \beta 3t/\beta 3w < 12 \tag{B2}$$

$$0.7 < (\beta 2t/\beta 2w)/(\beta 3t/\beta 3w) < 1.65 \tag{B3}$$

where

β2t represents a lateral magnification of the second lens group at the telephoto end, β2w represents a lateral magnification of the second lens group at the wide angle end, β3t represents a lateral magnification of the third lens group at the telephoto end, and β3w represents a lateral magnification of the third lens group at the wide angle end.

In high variable power zoom lens systems each including four positive, negative, positive, and positive lens groups, it is typical that the second lens group bears a main share of responsibility for achieving variable power while the third lens group is hardly, or only auxiliary, responsible for achieving variable power. Here, by assigning to the third lens group a large share of responsibility for exerting a variable-power function, it is possible to reduce variation in aberration occurring along with achievement of high variable power, and thus to achieve size reduction and improvement in performance.

The conditional formula (B1) defines a lateral magnification ratio of the second lens group between at the telephoto end and at the wide angle end. If an upper limit of the conditional formula (B1) is exceeded, the second lens group is forced to bear too much responsibility for achieving variable power, which makes it difficult to correct coma aberration generated in the second lens group. If a lower limit of the conditional formula (B1) is fallen short of, the third lens group is forced to bear too much responsibility for achieving variable power, which makes it difficult to correct spherical aberration generated in the third lens group.

The conditional formula (B2) defines a lateral magnification ratio of the third lens group between at the telephoto end and at the wide angle end. If an upper limit of the conditional formula (B2) is exceeded, the third lens group is forced to bear too much responsibility for achieving variable power, which makes it difficult to correct spherical aberration generated in the third lens group. If a lower limit of the conditional formula (B2) is fallen short of, the second lens group is forced to bear too much responsibility for achieving variable power, which makes it difficult to correct coma aberration generated in the second lens group.

The conditional formula (B3) defines a ratio between shares of responsibility for achieving variable power assigned to the second lens group and the third lens group. If an upper limit of the conditional formula (B3) is exceeded, the second lens group is forced to bear too much responsibility for achieving variable power, which makes it difficult to correct coma aberration generated in the second lens group. If a lower limit of the conditional formula (B3) is fallen short of, the third lens group is forced to bear too much responsibility for achieving variable power, which makes it difficult to correct spherical aberration generated in the third lens group.

According to the characteristic construction described above, it is possible to achieve a compact, high-performance, and super high variable power zoom lens system that has a zoom ratio of over 30× and yet has a wide-angle-side angle of view that is as wide as 88° to 90°, and an imaging optical device provided with such a zoom lens system. Furthermore, since the imaging optical device is made light weight and compact, by using the imaging optical device in a digital apparatus such as a digital camera or a portable information terminal unit, it is possible to provide the digital apparatus additionally with a high-performance image input function in a light-weight and compact manner. Thus, the characteristic construction contributes to, for example, reduction in size and cost of, and improvement in performance and functionality of, digital apparatuses. Hereinafter, descriptions will be given of conditions and the like for obtaining these advantages in a well-balanced manner, and for achieving higher optical performance, more compactness, and the like.

In view of achieving a compact, high variable power zoom lens system that has a wide angle of view and yet holds high optical performance, a zoom ratio of 30× to 38× is preferable. An attempt to obtain a high zoom ratio of approximately 30× to 38× usually makes it difficult to achieve size reduction, increase in angle of view, and improvement in performance of zoom lens systems, but according to the above-described characteristic construction where the shares of responsibility for achieving variable power assigned to the second and third lens groups satisfy the predetermined condition, it is possible to obtain a high zoom ratio while achieving size reduction, increase in angle of view, and improvement in performance. This makes it possible to achieve a wider angle of view along with higher variable power while achieving both compactness and high performance It is preferable that the first lens group include, sequentially from the object side, a cemented lens element including a negative lens element and a positive lens element, and a positive single lens element, and that the first lens group satisfy the following conditional formulas (B4) and (B5):

$$1.86 < Nd11 < 2 \tag{B4}$$

$$30 < vd11 < 40 \tag{B5}$$

where

Nd11 represents a refractive index of the negative lens element included in the first lens group with respect to a d-line, and vd11 represents an Abbe number of the negative lens element included in the first lens group with respect to the d-line.

In a high variable power zoom lens system, correction of chromatic aberration at the telephoto side is difficult, and it is necessary, in particular, to reduce chromatic aberration generated in the first lens group. Particularly second spectrum increases, and thus, typically, a lens element having an anomalous dispersion characteristic is often used as a positive lens element of the first lens group to achieve the reduction. Also, the negative lens element needs to have a strong refractive power to achieve a compact zoom lens system, but a strong refractive power leads to a large curvature, allowing strong coma aberration and/or strong astigmatism to be generated. Thus, it is necessary that the negative lens element have a high refractive index so as not to invite increase in the curvature, but unfortunately, glass materials having a refractive index of over 1.85 are usually characterized by having an anomalous dispersion characteristic on a plus side, and thus, even if an anomalous dispersion lens element is used as a positive lens element, it is difficult to correct secondary spectrum.

By selecting a glass material that satisfies the conditional formulas (B4) and (B5), it is possible to select a glass material that has a low anomalous dispersion characteristic and a strong refractive power. If a lower limit of the conditional formula (B4) is fallen short of, the refractive power becomes too weak, and this leads to an unpreferably large optical system. An attempt to maintain the optical power at the same level will lead to a large curvature, to cause large spherical aberration, which is difficult to correct. If an upper limit of the conditional formula (B4) is exceeded, surface refractive power becomes strong, and in particular, sensitivity to manufacturing errors of an aspherical wave becomes strong, making it disadvantageously difficult to produce the zoom lens system. If an upper limit of the conditional formula (B5) is exceeded, it leads to a too large dispersion value, and it becomes difficult to correct chromatic aberration. If a lower limit of the conditional formula (B5) is fallen short of, it means that a glass material having a high anomalous dispersion characteristic is selected, and thus it becomes difficult to correct chromatic aberration.

It is preferable that the present zoom lens system adopt one anomalous dispersion lens element as the positive lens element of the first lens group, so as to reduce secondary spectrum. In an area, to which the present optical system belongs, where an optical system at the telephoto end functions as a so-called super-telephoto lens system, correction of secondary spectrum is a problem to be dealt with, and in some cases, a plurality of anomalous dispersion lens elements are used, or, a lens element having a very high anomalous dispersion characteristic, such as a fluorite lens element, is used. The point of this correction is the correction of chromatic aberration on the negative lens element side, and selected as the negative lens element is one that is made of a glass material belonging to an area of small Abbe numbers. With a typically used optical glass material, which has a high positive anomalous dispersion, if it has a small Abbe number, the effect of the anomalous dispersion used in the positive lens element is cancelled, so that the secondary spectrum is corrected only insufficiently. Thus, it can be said to be preferable that the conditional formulas (B4) and (B5) be satisfied.

It is preferable that the following conditional formula (B6) be satisfied:

$$0.3 < \beta 4t/\beta 4w < 0.7 \tag{B6}$$

where $\beta 4t$ represents a lateral magnification of the fourth lens group at the telephoto end, and $\beta 4w$ represents a lateral magnification of the fourth lens group at the wide angle end.

The conditional formula (B6) defines a preferable lateral magnification ratio of the fourth lens group between at the telephoto end and at the wide angle end. To reduce the optical total length at the telephoto side, it is effective to satisfy the conditional formula (B6). The present optical system, having the small optical total length at the telephoto side despite having a zoom ratio of over 30×, contributes to achieving a compact lens barrel and a compact camera. If simply the optical total length at the telephoto end is reduced, it leads to total increase in the optical power of each of the lens groups, which makes it difficult to correct aberration; in contrast, if the lateral magnification of the fourth lens group at the telephoto end is made comparatively small so as to satisfy the conditional formula (B6), it is possible to reduce the optical total length.

If an upper limit of the conditional formula (B6) is exceeded, the combined focal length of the first to third lens groups becomes short, which makes it difficult to correct aberration, above all, field curvature. If a lower limit of the conditional formula (B6) is fallen short of, the optical total length is increased, which is not preferable from the viewpoint of achieving compactness. Furthermore, if the lower limit of the conditional formula (B6) is fallen short of, need arises to increase the refractive power of the second lens group, which may in turn increase astigmatism, and need arises to increase the refractive power of the third lens group, which may in turn increase spherical aberration.

It is preferable that the following conditional formula (B7) be satisfied:

$$-10 < \{(ywmax - Ymax)/Ymax\} \times 100 < -25 \tag{B7}$$

where ywmax represents the maximum real image height at the wide angle end, and

Ymax represents the maximum ideal image height.

The conditional formula (B7) defines a distortion ratio at the wide angle end. Allowing distortion in the range of the conditional formula (B7) to be generated at the wide angle end is effective particularly to reduce an external diameter of the first lens group. The generated distortion is able to be corrected by electronic means such that the distortion ratio is reduced to a level that does not cause any trouble. If an upper limit of the conditional formula (B7) is exceeded, the distortion ratio becomes so large that it causes an excessively large interpolation error in correcting the distortion by using the electronic means, which unpreferably leads to degradation of performance. If the lower limit of the conditional formula (B7) is fallen short of, the ratio of the generated distortion is low, which leads to a larger external diameter of the first lens group, and as a result, the entire size of a camera incorporating the optical system becomes larger, which is not preferable in terms of compactness.

A construction where a stop is positioned on the object side of the third lens group in the zoom type including the positive, negative, positive, and positive lens groups is strongly asymmetric at the wide angle end, and this leads to generation of a strong negative distortion. The distortion is generated mainly in the second lens group, and it is to be corrected mainly in the first and third lens groups. By generating a correcting effect in a lens element of the third lens group that is located closest to the image, it is possible to correct the distortion in the third lens group, although not very much effectively, because the third lens group is located close to a stop surface. In such a construction, spherical aberration is generated, but by correcting the distortion to be within the range defined by the conditional formula (B7), it becomes possible to preferably correct the spherical aberration within the third lens group. Note that, although an attempt to achieve a high variable ratio causes distortion aberration to be generated mainly in the second lens group, since a slightly larger share of responsibility for achieving variable power is assigned to the third lens group while a slightly smaller share of responsibility for achieving variable power is assigned to the second lens group according to the conditional formulas (B1) to (B3), as long as within the range of the conditional formula (B7), it is possible to correct, in a well-balanced manner, the distortion aberration generated in the second lens group in the first and third lens groups.

It is desirable that a surface of the third lens group that is located closest to the object side be formed of an aspherical surface. To assign a larger share of responsibility for achieving variable power to the third lens group than in the conventional construction, it is necessary to sufficiently correct spherical aberration in the third lens group. Thus, it is desirable that the lens element of the third lens group that is located closest to the object side have an aspherical surface. The third lens group has a strong positive refractive power, and mainly a lens surface that is disposed closest to the object side is responsible for the positive refractive power. By using an aspherical surface in the lens element located closest to the object side and having the surface with a strong refractive power, it is possible to effectively correct spherical aberration.

It is preferable that the second lens group include, sequentially from the object side, a negative meniscus lens element having a convex surface facing toward the object side, a cemented lens element including a biconcave negative lens element and a biconvex positive lens element, and a negative meniscus lens element having a convex surface facing toward an image side. Generally, a construction where a biconcave lens element and a biconvex lens element are not cemented together but used as two separate single lens elements is more effective in terms of aberration correction than using a cemented lens element made by cementing biconcave and biconvex lens elements together. Unfortunately, however, with an air gap between the biconcave lens element and the biconvex lens element, an error in the interval of the air gap has a great influence on the generation of spherical aberration, which gives rise to difficulty in production. It is possible to achieve a construction with an error of such a level that causes no problem in production, by constructing the second lens group with, as described above, sequentially from the object side, a negative meniscus lens element having a convex surface facing toward the object side, a cemented lens element including a biconcave negative lens element and a biconvex positive lens element, and a negative meniscus lens element having a convex surface facing toward the image side.

It is preferable that the following conditional formula (B8) be satisfied:

$$-0.3 < m3/TLt < -0.2 \tag{B8}$$

where m3 represents an absolute amount of movement of the third lens group in zooming from the wide angle end to the telephoto end (a minus sign indicates movement to the object side), and TLt represents the optical total length at the telephoto end.

If an upper limit of the conditional formula (B8) is exceeded, the amount of movement of the third lens group is reduced, making it difficult for the third lens group to fulfill its share of responsibility for achieving variable power. This results in a larger share of responsibility for achieving variable power to be assigned to the second lens group, which is disadvantageous in terms of aberration correction and makes it difficult to correct astigmatism and field curvature. On the other hand, if the lower limit of the conditional formula (B8) is fallen short of, the amount of movement of the third lens group is increased to increase the optical total length at the telephoto end, which is disadvantageous to compactness. An effort to effectively achieve compactness in spite of the increased amount of movement of the third lens group requires the second lens group to bear an increased share of responsibility for achieving variable power. If the refractive power of the second lens group is increased to meet the requirement, it may in turn increase spherical aberration.

It is preferable that the following conditional formula (B9) be satisfied:

$$-0.25 < m4/TLt < -0.1 \tag{B9}$$

where m4 represents an absolute amount of movement of the fourth lens group in zooming from the wide angle end to the telephoto end (a minus sign indicates movement to the object side), and TLt represents the optical total length at the telephoto end.

If an upper limit of the conditional formula (B9) is exceeded, the amount of movement of the fourth lens group is reduced, and thus difference in lateral magnification between at the wide angle end and at the telephoto end is reduced. As a result, the combined focal length of the first to third lens groups becomes short, which makes it difficult to correct aberration at the telephoto side, and correction of field curvature becomes difficult. On the other hand, if a lower limit of the conditional formula (B9) is fallen short of, the amount of movement of the fourth lens group is increased to increase the optical total length at the telephoto end, which is disadvantageous to compactness.

The above-described zoom lens systems of the first and second types are suitably usable as an imaging lens system for a digital apparatus (such as a digital camera) equipped with an image input function, and by combining the zoom lens systems with an image sensing device or the like, it is possible to construct an imaging optical device that optically takes in an image of a subject and outputs it in the form of an electrical signal. The imaging optical device is an optical device that constitutes a main component of a camera used for shooting a still or moving image of a subject, and the imaging optical device is constructed by being provided with, for example, sequentially from the object (that is, the subject) side, a zoom lens system that forms the optical image of the object, and an image sensing device that converts the optical image formed by the zoom lens system into an electric signal. And, by arranging the zoom lens system having the above-described characteristic construction such that the optical image of the subject is formed on the light receiving surface (that is, the image sensing surface) of the image sensing device, it is possible to realize a low-cost, high-performance, and compact high variable-power imaging optical device and a digital apparatus (for example, a digital camera, a mobile phone) incorporating the imaging optical device.

Examples of the camera include a digital camera, a video camera, a surveillance camera, an on-vehicle camera, a videophone camera, and so on, and also, cameras of a type that is built in, or externally connected to, a personal computer, a digital apparatus (for example, a compact and portable information apparatus terminal such as a mobile phone and a mobile computer), a peripheral apparatus thereof (a scanner, a printer, and the like), any other type of digital apparatus, and the like. As is clear from these examples, it is possible not only to design a camera with the imaging optical device but also to add a camera function to various apparatuses by incorporating the imaging optical device in those apparatuses. For example, it is possible to design a digital apparatus having the image input function such as a camera phone.

Figure 21:
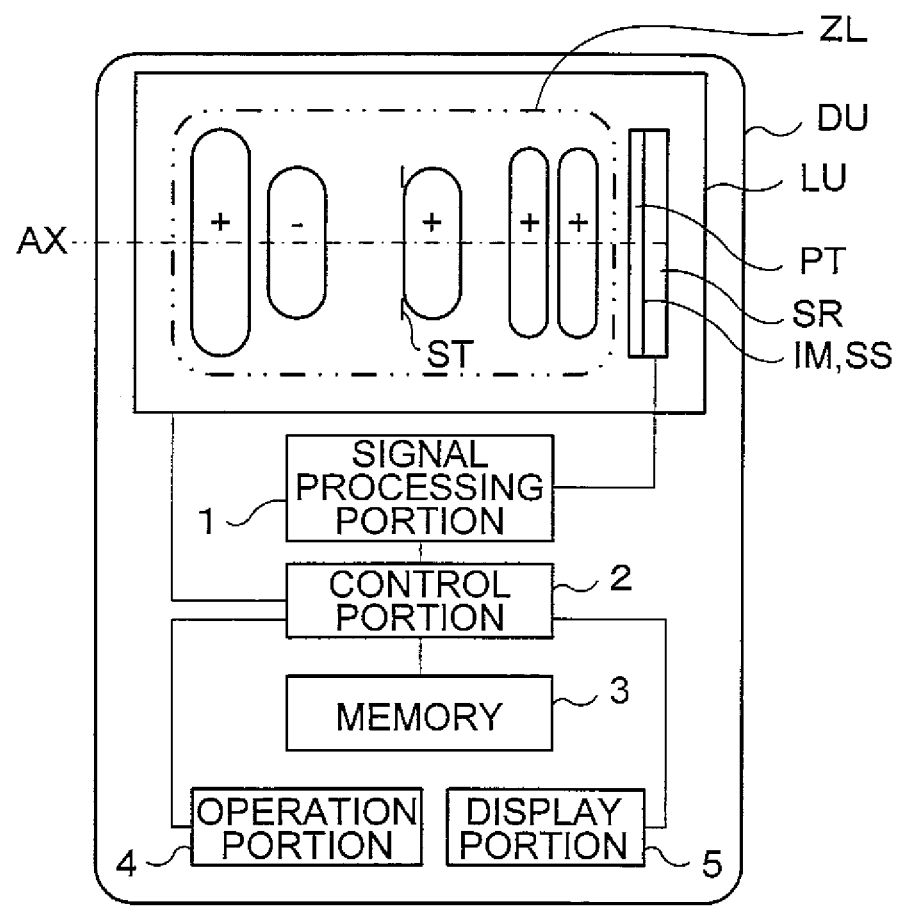
FIG. 21 is a schematic diagram showing an example of an outline of the construction of a digital apparatus incorporating an imaging optical device.

FIG. 21 shows, in a schematic sectional view, an example of an outline of the construction of a digital apparatus DU having an image input function. An imaging optical device LU incorporated in the digital apparatus DU shown in FIG. 21 includes, sequentially from the object (that is, the subject) side, a zoom lens system ZL (AX denotes an optical axis, and ST denotes a stop) that forms an optical image (image plane) IM of an object at variable power, a plane parallel plate PT (which corresponds to a cover glass of an image sensing device SR, an optical filter such as an optical low-pass filter or an infrared cutoff filter provided as necessary, or the like), and the image sensing device SR that converts the optical image IM formed on a light receiving surface SS by the zoom lens system ZL into an electric signal. In the case where the digital apparatus DU having the image input function is formed by using the imaging optical device LU, the imaging optical device LU is typically disposed inside a body of the digital apparatus DU, while in the case of realizing the camera function in various apparatuses, any form may be adopted as necessary. For example, a construction is possible in which the imaging optical device LU is formed as a unit so that it is mountable to/demountable from a main body of the digital apparatus DU or pivotable with respect thereto.

As the image sensing device SR, for example, there is adopted a solid-state image sensing device such as a CCD type image sensor or a CMOS type image sensor, which has a plurality of pixels. The zoom lens system ZL is arranged such that the optical image IM of the subject is formed on the light receiving surface SS, which is a photoelectric conversion portion of the image sensing device SR, and thus, the optical image IM formed by the zoom lens system ZL is converted into an electric signal by the image sensing device SR.

In addition to the imaging optical device LU, the digital apparatus DU includes a signal processing portion 1, a control portion 2, a memory 3, an operation portion 4, a display portion 5, and so on. A signal generated at the image sensing device SR is transmitted to the signal processing portion 1, where the signal is subjected to predetermined processing such as digital image processing and image compression processing, as necessary. Then, the signal is recorded as a digital image signal in the memory 3 (a semiconductor memory, an optical disc, or the like), or in some cases, the signal is transmitted to another apparatus via a cable or by being converted into, for example, an infrared signal (as in, for example, a communication function of a mobile phone). The control portion 2 includes a microcomputer, and centrally performs the following controls: control of functions such as a shooting function (for example, a still image shooting function, a moving image shooting function) and an image viewing function, control of a lens moving mechanism for zooming or focusing, and the like. For example, the control portion 2 controls the imaging optical device LU to perform at least one of still image shooting and moving image shooting of the subject. The display portion 5 includes a display such as a liquid crystal monitor, and displays images by using image signals obtained through conversion by the image sensing device SR or by using image information recorded in the memory 3. The operation portion 4 includes an operation member such as an operation button (for example, a release button) and/or an operation dial (for example, a shooting mode dial), and transmits to the control portion 2 information that an operator has inputted by operating the operation member.

The zoom lens system ZL has, as described above, the four-group zoom construction including the four positive, negative, positive, and positive lens groups, where the first to fourth lens groups each move along the optical axis AX to change an inter-group distance between the lens groups to thereby achieve variable power (that is, zooming), and the optical image 1M is formed on the light receiving surface SS of the image sensing device SR. Note that, in the later-described embodiments (FIG. 1 to FIG. 10), as zoom lens groups, the first to fourth lens group Gr1 to Gr4 function as moving lens groups, and in a five-group zoom lens system, a fifth lens group Gr5 functions as a stationary lens group.

Next, dealing with first to tenth embodiments, a further detailed description will be given of the specific optical construction of the zoom lens system ZL. FIGS. 1 to 10 are lens construction diagrams corresponding to zoom lens systems ZL included in the first to tenth embodiments, respectively, each showing a lens arrangement at the wide angle end (W) in optical section. In each of the lens construction diagrams, axial inter-surface distances denoted by di (i=1, 2, 3, ... ) are, among i-th axial inter-surface distances counted from the object side, axial inter-surface distances that are variable in zooming. In each of the lens construction diagrams, arrows m1, m2, m3, and m4 schematically indicate movement of the first lens group Gr1, the second lens group Gr2, the third lens group Gr3, and the fourth lens group Gr4, respectively, in zooming from the wide angle end (W) to the telephoto end (T). Besides, an arrow m5 illustrated closest to the image plane 1M indicates that the fifth lens group Gr5 and the plane parallel plate PT are stationary in zooming, and an arrow mP illustrated closest to the image plane IM indicates that the plane parallel plate PT is stationary in zooming.

In the first embodiment (FIG. 1), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a positive meniscus lens element convex to the object side, and a positive meniscus lens element convex to the object side. A second lens group Gr2 includes, sequentially from the object side, a biconcave negative lens element, and a cemented lens element including a biconcave negative lens element and a biconvex positive lens element (having an aspherical surface on the image side). A third lens group Gr3 includes, sequentially from the object side, a stop ST, a cemented lens element L31 (a first lens element) including a positive meniscus lens element (having an aspherical surface on the object side) convex to the object side, a negative meniscus lens element concave to the image side, and a biconvex positive lens element, and a negative meniscus lens element (having an aspherical surface on each side) L32 (a second lens element) concave to the object side. A fourth lens group Gr4 includes a cemented lens element including a biconvex positive lens element and a biconcave negative lens element. A fifth lens group Gr5 includes only a biconvex positive lens element (having an aspherical surface on each side).

In the second embodiment (FIG. 2), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a negative meniscus lens element concave to the image side and a cemented lens element including a biconcave negative lens element and a biconvex positive lens element. A third lens group Gr3 includes, sequentially from the object side, a stop ST, a cemented lens element L31 (a first lens element) including a positive meniscus lens element (having an aspherical surface on the object side) convex to the object side, a negative meniscus lens element concave to the image side, and a positive meniscus lens element convex to the object side, and a positive meniscus lens element (having an aspherical surface on each side) L32 (a second lens element) convex to the image side. A fourth lens group Gr4 includes a cemented lens element including a biconvex positive lens element and a biconcave negative lens element. A fifth lens group Gr5 includes only a positive meniscus lens element (having an aspherical surface on each side) convex to the object side.

In the third embodiment (FIG. 3), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a negative meniscus lens element concave to the image side, a cemented lens element including a biconcave negative lens element and a biconvex positive lens element, and a negative meniscus lens element (having an aspherical surface on each side) concave to the object side. A third lens group Gr3 includes, sequentially from the object side, a stop ST, a cemented lens element L31 (a first lens element) including a biconvex positive lens element (having an aspherical surface on the object side), a biconcave negative lens element, and a positive meniscus lens element convex to the object side, and a positive meniscus lens element (having an aspherical surface on each side) L32 (a second lens element) convex to the object side. A fourth lens group Gr4 includes a cemented lens element including a biconvex positive lens element and a biconcave negative lens element. A fifth lens group Gr5 includes only a positive meniscus lens element (having an aspherical surface on each side) convex to the object side.

In the fourth embodiment (FIG. 4), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a biconcave negative lens element, and a cemented lens element including a biconcave negative lens element and a biconvex positive lens element (having an aspherical surface on the image side). A third lens group Gr3 includes, sequentially from the object side, a stop ST, a cemented lens element L31 (a first lens element) including a biconvex positive lens element (having an aspherical surface on the object side), a biconcave negative lens element, and a positive meniscus lens element convex to the object side, and a biconvex positive lens element (having an aspherical surface on each side) L32 (a second lens element). A fourth lens group Gr4 includes a cemented lens element including a biconvex positive lens element and a biconcave negative lens element. A fifth lens group Gr5 includes only a positive meniscus lens element (having an aspherical surface on each side) convex to the object side.

In the fifth embodiment (FIG. 5), in a four-group zoom construction including positive, negative, positive, and positive lens groups, the lens groups are constructed as follows. A first lens group Gr1 includes, sequentially from the object side, a cemented lens element including a negative meniscus lens element concave to the image side and a positive meniscus lens element convex to the object side, and a positive meniscus lens element convex to the object side. A second lens group Gr2 includes, sequentially from the object side, a negative meniscus lens element concave to the image side and a cemented lens element including a biconcave negative lens element and a biconvex positive lens element. A third lens group Gr3 includes, sequentially from the object side, a stop ST, a cemented lens element L31 (a first lens element) including a positive meniscus lens element (having an aspherical surface on the object side) convex to the object side, a negative meniscus lens element concave to the image side, and a positive meniscus lens element convex to the object side, and a biconvex positive lens element (having an aspherical surface on each side) L32 (a second lens element). A fourth lens group Gr4 includes a cemented lens element including a biconvex positive lens element and a biconcave negative lens element.

In the sixth embodiment (FIG. 6), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a biconcave negative lens element, and a cemented lens element including a biconcave negative lens element and a biconvex positive lens element (having an aspherical surface on the image side). A third lens group Gr3 includes, sequentially from the object side, a stop ST, a cemented lens element including a biconvex positive lens element (having an aspherical surface on the object side), a biconcave negative lens element, and a positive meniscus lens element convex to the object side, and a biconvex positive lens element (having an aspherical surface on each side). A fourth lens group Gr4 includes a cemented lens element including a biconvex positive lens element and a biconcave negative lens element. A fifth lens group Gr5 includes only a biconvex positive lens element (having an aspherical surface on each side).

In the seventh embodiment (FIG. 7), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a negative meniscus lens element concave to the image side, a cemented lens element including a biconcave negative lens element and a biconvex positive lens element, and a negative meniscus lens element (having an aspherical surface on each side) concave to the object side. That is, the second lens group Gr2 includes, sequentially from the object side, a negative meniscus lens element having a convex surface facing toward the object side, a cemented lens element including a biconcave negative lens element and a biconvex positive lens element, and a negative meniscus lens element having a convex surface facing toward the image side. A third lens group Gr3 includes, sequentially from the object side, a stop ST, a cemented lens element including a biconvex positive lens element (having an aspherical surface on the object side), a biconcave negative lens element, and a positive meniscus lens element convex to the object side, and a positive meniscus lens element (having an aspherical surface on each side) convex to the object side. A fourth lens group Gr4 includes a cemented lens element including a biconvex positive lens element and a biconcave negative lens element. A fifth lens group Gr5 includes only a positive meniscus lens element (having an aspherical surface on each side) convex to the object side.

In the eighth embodiment (FIG. 8), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a negative meniscus lens element concave to the image side, a biconcave negative lens element (having an aspherical surface on each side), and a biconvex positive lens element. A third lens group Gr3 includes, sequentially from the object side, a stop ST, a biconvex positive lens element (having an aspherical surface on each side), a negative meniscus lens element concave to the image side, and a cemented lens element including a negative meniscus lens element concave to the image side and a positive meniscus lens element convex to the object side. A fourth lens group Gr4 includes a cemented lens element including a biconvex positive lens element and a biconcave negative lens element. A fifth lens group Gr5 includes only a positive meniscus lens element (having an aspherical surface on each side) convex to the image side.

In the ninth embodiment (FIG. 9), in a five-group zoom construction including positive, negative, positive, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a biconcave negative lens element, and a cemented lens element including a biconcave negative lens element (having an aspherical surface on the object side) and a biconvex positive lens element. A third lens group Gr3 includes, sequentially from the object side, a stop ST, a cemented lens element including a biconvex positive lens element (having an aspherical surface on the object side) and a biconcave negative lens element, and a cemented lens element including a negative meniscus lens element concave to the image side and a biconvex positive lens element (having an aspherical surface on the image side). A fourth lens group Gr4 includes a cemented lens element including a biconvex positive lens element and a biconcave negative lens element. A fifth lens group Gr5 includes only a positive meniscus lens element (having an aspherical surface on each side) convex to the image side.

In the tenth embodiment (FIG. 10), in a four-group zoom construction including positive, negative, positive, and positive lens groups, the lens groups are constructed as follows. A first lens group Gr1 includes, sequentially from the object side, a cemented lens element including a negative meniscus lens element concave to the image side and a biconvex positive lens element, and a positive meniscus lens element convex to the object side. A second lens group Gr2 includes, sequentially from the object side, a biconcave negative lens element, and a cemented lens element including a biconcave negative lens element and a biconvex positive lens element (having an aspherical surface on the image side). A third lens group Gr3 includes, sequentially from the object side, a stop ST, a cemented lens element including a biconvex positive lens element (having an aspherical surface on the object side), a biconcave negative lens element, and a positive meniscus lens element convex to the object side, and a positive meniscus lens element (having an aspherical surface on each side) convex to the object side. A fourth lens group Gr4 includes a cemented lens element including a biconvex positive lens element and a biconcave negative lens element.

EXAMPLES

Hereinafter, further specific descriptions will be given of features of the zoom lens systems embodying the invention, such as the construction thereof, with reference to construction data and other data of examples. Examples 1 to 10 (EX1 to EX10) presented below are numerical examples corresponding to the above-described first to tenth embodiments, respectively. Thus, the optical construction diagrams (FIGS. 1 to 10) showing the first to tenth embodiments also show the lens constructions of Examples 1 to 10, respectively.

The construction data of each example includes, as surface data, sequentially from the leftmost column, ri denoting the i-th radius of curvature (in mm), di denoting the i-th axial inter-surface distance (in mm), Ni denoting the i-th refractive index with respect to the d-line (a wavelength of 587.56 nm), vi denoting the i-th Abbe number with respect to the d-line, and the focal length (in mm) of each lens element, where "i-th" indicates an order counted from the object side. A surface whose radius of curvature ri is marked with an asterisk (*) is an aspherical surface, and the surface shape of an aspherical surface is defined by formula (AS) below, employing the local rectangular coordinate system (x, y, z) having an origin at the vertex of the aspherical surface. As aspherical surface data, an aspherical surface coefficient and the like are presented. Note that, in the aspherical surface data of the examples, the coefficient of an unlisted term is zero, and $E-n=\times 10^{-n}$ applies to all the data.

$$z=(c \cdot h^2)/\{1+\sqrt{(1-\epsilon \cdot c^2 \cdot h^2)}\}+\Sigma(Aj \cdot h^j) \quad (AS)$$

where h represents a height ($h^2=x^2+y^2$) in a direction perpendicular to a z-axis (an optical axis AX), z represents an amount of sag (with respect to a surface vertex) at a position of the height h in a direction of the optical axis AX, c represents a curvature (the reciprocal of the radius of curvature r) at a surface vertex;

$\epsilon$ represents quadric surface parameter, and

Aj represents an aspherical surface coefficient of the j-th order.

As miscellaneous data, the zoom ratio, the focal length of the entire optical system (f, in mm), the angle of view (2ω, in °), the back focus (BF, in mm), the total lens length (TL, in mm), the F-number (Fno.), and the image height (Y', in mm) are presented, and the focal length (in mm) of each lens group is presented as zoom lens-group data. Note that the back focus (BF) used here indicates the distance from the image-side surface of a cover glass (corresponding to the plane parallel plate PT) to the image plane. Furthermore, Table 1 and Table 2 show values corresponding to the conditional formulas of the examples.

FIGS. 11A-11I to 20A-20I are aberration diagrams corresponding to Examples 1 to 10 (EX 1 to EX 10), respectively, where (W) denotes the wide-angle end, (M) denotes the middle-focal-length position, and (T) denotes the telephoto end, and FIGS. 11A-11I to 20A-20I show aberrations (sequentially from the leftmost side, spherical aberration and so on, astigmatism, and distortion aberration) at (W), (M), and (T). In FIGS. 11A-11I to 20A-20I, FNO denotes the F number, and Y' (in mm) denotes the maximum image height (corresponding to the distance from the optical axis AX) on the light receiving surface SS of the image sensing device SR. In the spherical aberration diagrams, a solid line d indicates spherical aberration (in mm) with respect to the d-line, and a broken line SC indicates deviation (in mm) from sine condition to be fulfilled. In the astigmatism diagrams, a broken line DM represents astigmatism (in mm) with respect to the d-line on the meridional surface, and a solid line DS represents astigmatism (in mm) with respect to the d-line on the sagittal surface. Besides, in the distortion diagrams, a solid line represents distortion (in %) with respect to the d-line.

Example 1

| | | | | | | | | |
|---|---|---|---|---|---|---|---|---|
| Unit: mm | | | | | | | | |
| Surface Data | | | | | | | | |
| | Radius of Curvature | | Axial Distance | | Refractive Index | | Abbe Number | Focal Length |
| Object Plane | ∞ | d0 | ∞ | | | | | |
| r1 | 45.035 | d1 | 1.000 | N1 | 1.91082 | ν1 | 35.25 | 611.45 |
| r2 | 22.120 | d2 | 3.707 | N2 | 1.49700 | ν2 | 81.61 | |
| r3 | 6138.359 | d3 | 0.100 | | | | | |
| r4 | 23.012 | d4 | 3.164 | N3 | 1.61800 | ν3 | 63.39 | 40.2 |
| r5 | 295.850 | d5 | | 1.017~11.964~23.790 | | | | |
| r6 | −43.724 | d6 | 0.600 | N4 | 1.91082 | ν4 | 35.25 | −7.88 |
| r7 | 8.648 | d7 | 3.342 | | | | | |
| r8 | −21.228 | d8 | 0.500 | N5 | 1.88300 | ν5 | 40.80 | −47.62 |
| r9 | 10.866 | d9 | 0.010 | N6 | 1.51400 | ν6 | 42.83 | |
| r10 | 10.866 | d10 | 1.588 | N7 | 2.00272 | ν7 | 19.32 | |
| r11* | −110.055 | d11 | | 23.216~8.847~1.000 | | | | |
| r12 (Stop) | ∞ | d12 | 0.300 | | | | | |
| r13* | 7.110 | d13 | 2.294 | N8 | 1.75539 | ν8 | 47.67 | 11.4 |
| r14 | 53.277 | d14 | 0.010 | N9 | 1.51400 | ν9 | 42.83 | |
| r15 | 53.277 | d15 | 0.600 | N10 | 1.82425 | ν10 | 33.90 | |
| r16 | 5.676 | d16 | 0.010 | N11 | 1.51400 | ν11 | 42.83 | |
| r17 | 5.676 | d17 | 2.308 | N12 | 1.62616 | ν12 | 55.44 | |
| r18 | −48.526 | d18 | 0.804 | | | | | |
| r19* | −16.382 | d19 | 0.703 | N13 | 1.59505 | ν13 | 36.11 | −31.33 |
| r20* | −137.366 | d20 | | 4.304~8.150~11.237 | | | | |
| r21 | 9.693 | d21 | 2.219 | N14 | 1.57098 | ν14 | 50.80 | 51.37 |
| r22 | −72.911 | d22 | 0.500 | N15 | 1.90366 | ν15 | 31.32 | |
| r23 | 23.133 | d23 | | 4.754~15.008~18.716 | | | | |
| r24* | 3785.441 | d24 | 1.800 | N16 | 1.53048 | ν16 | 55.72 | 50.21 |
| r25* | −26.822 | d25 | 0.600 | | | | | |
| r26 | ∞ | d26 | 0.600 | N17 | 1.51680 | ν17 | 64.20 | |
| r27 | ∞ | BF = | | 2.51~2.49~2.43 | | | | |
| Image Plane | ∞ | | | | | | | |

| | |
|---|---|
| Aspherical Surface Data | |
| r11 | |
| ε = | 1.0000 |
| A4 = | −0.59066086E−04 |
| A6 = | −0.52439324E−06 |
| A8 = | 0.56268214E−07 |
| A10 = | −0.17460150E−08 |
| r13 | |
| ε = | 1.0192 |
| A4 = | −0.16224181E−03 |
| A6 = | −0.37595583E−05 |
| A8 = | 0.32264368E−07 |
| A10 = | −0.15562369E−08 |
| r19 | |
| ε = | 1.0000 |
| A4 = | 0.42970217E−02 |
| A6 = | −0.13925291E−03 |
| A8 = | 0.28867932E−05 |
| A10 = | −0.45792442E−07 |
| r20 | |
| ε = | 1.0000 |
| A4 = | 0.47558345E−02 |

-continued

| Unit: mm | |
|---|---|
| A6 = | −0.88669753E−04 |
| A8 = | 0.13037719E−05 |
| r24 | |
| ϵ = | 1.0000 |
| A4 = | −0.11038475E−02 |
| A6 = | 0.99443584E−04 |
| A8 = | −0.59909699E−05 |
| A10 = | 0.69558336E−07 |
| r25 | |
| ϵ = | 1.0000 |
| A4 = | −0.10987139E−02 |
| A6 = | 0.16070476E−03 |
| A8 = | −0.10080126E−04 |
| A10 = | 0.16874855E−06 |

Miscellaneous Data
Zoom Ratio: 17.93

| | (W) | ~ | (M) | ~ | (T) |
|---|---|---|---|---|---|
| f = | 4.92 | ~ | 20.64 | ~ | 88.21 |
| 2ω = | 78.2° | ~ | 21.9° | ~ | 5.2° |
| BF = | 2.51 | ~ | 2.49 | ~ | 2.43 |
| TL = | 62.56 | ~ | 73.22 | ~ | 83.93 |
| FNO. = | 3.04 | ~ | 4.96 | ~ | 5.70 |
| Y' = | 4.0 | ~ | 4.0 | ~ | 4.0 |

Zoom Lens Group Data

| Group | Focal Length |
|---|---|
| 1st Group | 38.25 |
| 2nd Group | −6.44 |
| 3rd Group | 14.91 |
| 4th Group | 51.37 |
| 5th Group | 50.21 |

Example 2

| Unit: mm | | | | | | | | |
|---|---|---|---|---|---|---|---|---|
| Surface Data | | | | | | | | |
| | Radius of Curvature | | Axial Distance | | Refractive Index | | Abbe Number | Focal Length |
| Object Plane | ∞ | d0 | ∞ | | | | | |
| r1 | 74.079 | d1 | 0.800 | N1 | 1.90366 | ν1 | 31.32 | −876.7 |
| r2 | 23.287 | d2 | 3.809 | N2 | 1.49700 | ν2 | 81.61 | |
| r3 | −124.194 | d3 | 0.100 | | | | | |
| r4 | 23.579 | d4 | 2.753 | N3 | 1.77250 | ν3 | 49.62 | 33.98 |
| r5 | 219.882 | d5 | 0.600~11.383~22.549 | | | | | |
| r6 | 140.300 | d6 | 0.600 | N4 | 1.91082 | ν4 | 35.25 | −10.02 |
| r7 | 8.552 | d7 | 2.556 | | | | | |
| r8 | −9.692 | d8 | 0.500 | N5 | 1.88300 | ν5 | 40.80 | −14.74 |
| r9 | 9.118 | d9 | 0.010 | N6 | 1.51400 | ν6 | 42.83 | |
| r10 | 9.118 | d10 | 1.511 | N7 | 1.94595 | ν7 | 17.98 | |
| r11 | −63.842 | d11 | 16.607~6.164~0.100 | | | | | |
| r12 (Stop) | ∞ | d12 | 0.400 | | | | | |
| r13* | 6.783 | d13 | 1.767 | N8 | 1.76802 | ν8 | 49.24 | 14 |
| r14 | 34.184 | d14 | 0.010 | N9 | 1.51400 | ν9 | 42.83 | |
| r15 | 34.184 | d15 | 0.500 | N10 | 1.80518 | ν10 | 25.46 | |
| r16 | 7.613 | d16 | 0.010 | N11 | 1.51400 | ν11 | 42.83 | |
| r17 | 7.613 | d17 | 1.800 | N12 | 1.65844 | ν12 | 50.85 | |
| r18 | 18.731 | d18 | 1.153 | | | | | |
| r19* | −23.657 | d19 | 1.013 | N13 | 1.53048 | ν13 | 55.72 | 92.91 |
| r20* | −16.222 | d20 | 4.441~8.211~10.011 | | | | | |
| r21 | 9.854 | d21 | 2.343 | N14 | 1.58913 | ν14 | 61.25 | 40.9 |

-continued

| Unit: mm | | | | | | | | |
|---|---|---|---|---|---|---|---|---|
| r22 | −34.329 | d22 | 0.400 | N15 | 1.80610 | ν15 | 33.27 | |
| r23 | 24.531 | d23 | | | 4.801~15.726~20.350 | | | |
| r24* | 26.601 | d24 | 1.355 | N16 | 1.53048 | ν16 | 55.72 | 60.72 |
| r25* | 150.050 | d25 | 0.300 | | | | | |
| r26 | ∞ | d26 | 0.600 | N17 | 1.51680 | ν17 | 64.20 | |
| r27 | ∞ | BF = | | | 2.51~2.53~2.53 | | | |
| Image Plane | ∞ | | | | | | | |

Aspherical Surface Data r13

$\epsilon$ = 1.0192
A4 = −0.15647940E−03
A6 = −0.87841026E−05
A8 = 0.57296279E−06
A10 = −0.23904675E−07 r19

$\epsilon$ = 1.0000
A4 = 0.11598099E−02
A6 = 0.14428944E−03
A8 = −0.57810222E−05
A10 = 0.10520578E−06 r20

$\epsilon$ = 1.0000
A4 = 0.18845280E−02
A6 = 0.14585656E−03
A8 = −0.26862244E−05
A10 = 0.86458149E−07 r24

$\epsilon$ = 1.0000
A4 = −0.19347488E−02
A6 = 0.14096575E−03
A8 = −0.77666941E−05
A10 = −0.18451296E−08 r25

$\epsilon$ = 1.0000
A4 = −0.24212416E−02
A6 = 0.28446863E−03
A8 = −0.18172092E−04
A10 = 0.29136650E−06

Miscellaneous Data
Zoom Ratio: 18.94

| | (W) | ~ | (M) | ~ | (T) |
|---|---|---|---|---|---|
| f = | 4.69 | ~ | 20.41 | ~ | 88.83 |
| 2ω = | 80.9 | ~ | 22.2 | ~ | 5.16 |
| BF = | 2.51 | ~ | 2.53 | ~ | 2.53 |
| TL = | 53.25 | ~ | 68.31 | ~ | 79.83 |
| FNO. = | 3.10 | ~ | 5.00 | ~ | 5.70 |
| Y' = | 4.0 | ~ | 4.0 | ~ | 4.0 |

Zoom Lens Group Data

| Group | Focal Length |
|---|---|
| 1st Group | 35.06 |
| 2nd Group | −5.46 |
| 3rd Group | 12.98 |
| 4th Group | 40.9 |
| 5th Group | 60.72 |

Example 3

Unit: mm

Surface Data

| | Radius of Curvature | | Axial Distance | | Refractive Index | | Abbe Number | Focal Length |
|---|---|---|---|---|---|---|---|---|
| Object Plane | ∞ | d0 | ∞ | | | | | |
| r1 | 81.473 | d1 | 1.200 | N1 | 1.90366 | v1 | 31.32 | 480.67 |
| r2 | 37.397 | d2 | 0.010 | N2 | 1.51400 | v2 | 42.83 | |
| r3 | 37.397 | d3 | 5.238 | N3 | 1.49700 | v3 | 81.61 | |
| r4 | −275.854 | d4 | 0.100 | | | | | |
| r5 | 34.764 | d5 | 3.933 | N4 | 1.62229 | v4 | 53.17 | 70.01 |
| r6 | 164.571 | d6 | | | 0.600~24.900~44.597 | | | |
| r7 | 51.438 | d7 | 0.600 | N5 | 1.90366 | v5 | 31.32 | −10.58 |
| r8 | 8.019 | d8 | 4.961 | | | | | |
| r9 | −10.587 | d9 | 0.500 | N6 | 1.83481 | v6 | 42.72 | −33.68 |
| r10 | 17.404 | d10 | 0.010 | N7 | 1.51400 | v7 | 42.83 | |
| r11 | 17.404 | d11 | 1.819 | N8 | 1.94595 | v8 | 17.98 | |
| r12 | −24.185 | d12 | 0.695 | | | | | |
| r13* | −22.894 | d13 | 0.800 | N9 | 1.69350 | v9 | 53.20 | −75.01 |
| r14* | −41.473 | d14 | | | 27.558~8.872~0.669 | | | |
| r15 (Stop) | ∞ | d15 | 1.000 | | | | | |
| r16* | 9.321 | d16 | 3.474 | N10 | 1.74330 | v10 | 49.33 | 21.75 |
| r17 | −15.333 | d17 | 0.010 | N11 | 1.51400 | v11 | 42.83 | |
| r18 | −15.333 | d18 | 5.221 | N12 | 1.83400 | v12 | 37.34 | |
| r19 | 6.180 | d19 | 0.010 | N13 | 1.51400 | v13 | 42.83 | |
| r20 | 6.180 | d20 | 2.426 | N14 | 1.58913 | v14 | 61.25 | |
| r21 | 82.678 | d21 | 0.633 | | | | | |
| r22* | 17.586 | d22 | 1.909 | N15 | 1.58313 | v15 | 59.46 | 40.16 |
| r23* | 67.777 | d23 | | | 4.306~7.567~15.940 | | | |
| r24 | 13.648 | d24 | 2.226 | N16 | 1.57098 | v16 | 50.80 | 152.2 |
| r25 | −66.031 | d25 | 0.010 | N17 | 1.51400 | v17 | 42.83 | |
| r26 | −66.031 | d26 | 0.624 | N18 | 1.90366 | v18 | 31.32 | |
| r27 | 38.024 | d27 | | | 3.620~19.230~26.452 | | | |
| r28* | 22.436 | d28 | 1.812 | N19 | 1.53048 | v19 | 55.72 | 78.16 |
| r29* | 47.523 | d29 | 1.675 | | | | | |
| r30 | ∞ | d30 | 1.100 | N20 | 1.51680 | v20 | 64.20 | |
| r31 | ∞ | BF = | | | 1.96~1.96~2.0 | | | |
| Image Plane | ∞ | | | | | | | |

Aspherical Surface Data r13

$\epsilon$ = 1.0000
A4 = 0.24145862E−03
A6 = −0.16206578E−04
A8 = 0.29429550E−06
A10 = −0.38337456E−08 r14

$\epsilon$ = 1.0000
A4 = 0.18468313E−03
A6 = −0.14191523E−04
A8 = 0.28833960E−06
A10 = −0.37574697E−08 r16

$\epsilon$ = 1.0192
A4 = −0.52487646E−04
A6 = 0.56575338E−06
A8 = −0.89428352E−07
A10 = 0.64262282E−08
A12 = −0.19917914E−09
A14 = 0.18959592E−11 r22

$\epsilon$ = 1.0000
A4 = −0.15637754E−03
A6 = −0.95235497E−05
A8 = −0.43075007E−06
A10 = −0.24257873E−08 r23

$\epsilon$ = 1.0000
A4 = 0.58414553E−04
A6 = −0.70845249E−05

| Unit: mm | |
|---|---|
| A8 = | −0.51658779E−06 |
| A10 = | 0.70563911E−08 |
| r28 | |
| ϵ = | 1.0000 |
| A4 = | −0.10576609E−02 |
| A6 = | 0.68848314E−04 |
| A8 = | −0.38272657E−05 |
| A10 = | 0.56227484E−07 |
| r29 | |
| ϵ = | 1.0000 |
| A4 = | −0.14576869E−02 |
| A6 = | 0.10080345E−03 |
| A8 = | −0.55396727E−05 |
| A10 = | 0.91297524E−07 |

Miscellaneous Data
Zoom Ratio: 37.85

|  | (W) | ~ | (M) | ~ | (T) |
|---|---|---|---|---|---|
| f = | 4.11 | ~ | 24.18 | ~ | 155.56 |
| 2ω = | 88.5° | ~ | 18.8° | ~ | 2.95° |
| BF = | 1.96 | ~ | 1.96 | ~ | 2.0 |
| TL = | 80.04 | ~ | 104.52 | ~ | 131.65 |
| FNO. = | 3.49 | ~ | 5.24 | ~ | 5.86 |
| Y' = | 4.0 | ~ | 4.0 | ~ | 4.0 |

Zoom Lens Group Data

| Group | Focal Length |
|---|---|
| 1st Group | 61.48 |
| 2nd Group | −6.4 |
| 3rd Group | 16.82 |
| 4th Group | 66.5 |
| 5th Group | 78.16 |

Example 4

Unit: mm

Surface Data

| | Radius of Curvature | | Axial Distance | | Refractive Index | | Abbe Number | Focal Length |
|---|---|---|---|---|---|---|---|---|
| Object Plane | ∞ | d0 | ∞ | | | | | |
| r1 | 80.025 | d1 | 1.577 | N1 | 1.90366 | v1 | 31.32 | 560.18 |
| r2 | 36.801 | d2 | 4.894 | N2 | 1.49700 | v2 | 81.61 | |
| r3 | −341.569 | d3 | 0.100 | | | | | |
| r4 | 35.448 | d4 | 4.005 | N3 | 1.62229 | v3 | 53.17 | 67.58 |
| r5 | 215.951 | d5 | | 0.869~23.270~43.459 | | | | |
| r6 | −582.835 | d6 | 0.603 | N4 | 1.91082 | v4 | 35.25 | −9.44 |
| r7 | 8.727 | d7 | 5.135 | | | | | |
| r8 | −17.747 | d8 | 0.749 | N5 | 1.88300 | v5 | 40.80 | −45.05 |
| r9 | 14.842 | d9 | 0.010 | N6 | 1.51400 | v6 | 42.83 | |
| r10 | 14.842 | d10 | 2.672 | N7 | 2.00272 | v7 | 19.32 | |
| r11* | −55.848 | d11 | | 38.312~11.399~1.884 | | | | |
| r12 (Stop) | ∞ | d12 | 1.150 | | | | | |
| r13* | 9.997 | d13 | 3.059 | N8 | 1.74330 | v8 | 49.33 | 22.7 |
| r14 | −24.000 | d14 | 0.010 | N9 | 1.51400 | v9 | 42.83 | |
| r15 | −24.000 | d15 | 5.324 | N10 | 1.83400 | v10 | 37.34 | |
| r16 | 6.777 | d16 | 0.010 | N11 | 1.51400 | v11 | 42.83 | |
| r17 | 6.777 | d17 | 2.500 | N12 | 1.61800 | v12 | 63.39 | |
| r18 | 61.357 | d18 | 0.943 | | | | | |
| r19* | 72.486 | d19 | 1.200 | N13 | 1.53048 | v13 | 55.72 | 79.82 |
| r20* | −101.244 | d20 | | 6.284~6.662~15.561 | | | | |
| r21 | 13.565 | d21 | 2.455 | N14 | 1.57098 | v14 | 50.80 | 56.16 |
| r22 | −40.811 | d22 | 0.615 | N15 | 1.90366 | v15 | 31.32 | |
| r23 | 50.038 | d23 | | 4.711~22.059~26.272 | | | | |
| r24* | 31.947 | d24 | 1.761 | N16 | 1.53048 | v16 | 55.72 | 157.63 |
| r25* | 50.711 | d25 | 0.618 | | | | | |

-continued

| Unit: mm | | | | | | | |
|---|---|---|---|---|---|---|---|
| r26 | ∞ | d26 | 0.600 | N17 | 1.51680 | ν17 | 64.20 |
| r27 | ∞ | BF = | | | 2.48~2.48~2.41 | | |
| Image Plane | ∞ | | | | | | |

Aspherical Surface Data r11

| | |
|---|---|
| ϵ = | 1.0000 |
| A4 = | −0.29995476E−04 |
| A6 = | 0.59300125E−07 |
| A8 = | −0.41239700E−08 |
| A10 = | 0.56072596E−10 | r13

| | |
|---|---|
| ϵ = | 1.0192 |
| A4 = | −0.45308335E−04 |
| A6 = | 0.16998131E−06 |
| A8 = | −0.10305262E−07 |
| A10 = | 0.13671803E−09 | r19

| | |
|---|---|
| ϵ = | 1.0000 |
| A4 = | 0.22433487E−05 |
| A6 = | −0.15924835E−04 |
| A8 = | 0.48187007E−06 |
| A10 = | −0.11986145E−07 | r20

| | |
|---|---|
| ϵ = | 1.0000 |
| A4 = | 0.20224326E−03 |
| A6 = | −0.11886985E−04 |
| A8 = | 0.39435590E−06 |
| A10 = | −0.73914496E−08 | r24

| | |
|---|---|
| ϵ = | 1.0000 |
| A4 = | −0.23059971E−02 |
| A6 = | 0.15375941E−03 |
| A8 = | −0.89078357E−05 |
| A10 = | 0.18303116E−06 | r25

| | |
|---|---|
| ϵ = | 1.0000 |
| A4 = | −0.34012937E−02 |
| A6 = | 0.22992180E−03 |
| A8 = | −0.11446638E−04 |
| A10 = | 0.21662181E−06 |

Miscellaneous Data
Zoom Ratio: 34.11

| | (W) | ~ | (M) | ~ | (T) |
|---|---|---|---|---|---|
| f = | 4.11 | ~ | 24.00 | ~ | 140.19 |
| 2ω = | 88.5° | ~ | 18.9° | ~ | 3.27° |
| BF = | 2.48 | ~ | 2.48 | ~ | 2.41 |
| TL = | 92.65 | ~ | 105.87 | ~ | 129.58 |
| FNO. = | 3.13 | ~ | 5.02 | ~ | 5.90 |
| Y' = | 4.0 | ~ | 4.0 | ~ | 4.0 |

Zoom Lens Group Data

| Group | Focal Length |
|---|---|
| 1st Group | 60.83 |
| 2nd Group | −7.32 |
| 3rd Group | 19.73 |
| 4th Group | 56.16 |
| 5th Group | 157.63 |

Example 5

Unit: mm

Surface Data

| | Radius of Curvature | | Axial Distance | | Refractive Index | | Abbe Number | Focal Length |
|---|---|---|---|---|---|---|---|---|
| Object Plane | ∞ | d0 | ∞ | | | | | |
| r1 | 52.241 | d1 | 0.800 | N1 | 1.90366 | ν1 | 31.32 | −473.92 |
| r2 | 20.837 | d2 | 3.695 | N2 | 1.49700 | ν2 | 81.61 | |
| r3 | 14579.385 | d3 | 0.100 | | | | | |
| r4 | 22.429 | d4 | 2.802 | N3 | 1.77250 | ν3 | 49.62 | 33.36 |
| r5 | 163.545 | d5 | | | 0.600~11.747~22.737 | | | |
| r6 | 53.461 | d6 | 0.600 | N4 | 1.91082 | ν4 | 35.25 | −10.56 |
| r7 | 8.109 | d7 | 3.623 | | | | | |
| r8 | −8.308 | d8 | 0.500 | N5 | 1.88300 | ν5 | 40.80 | −14.38 |
| r9 | 10.928 | d9 | 0.010 | N6 | 1.51400 | ν6 | 42.83 | |
| r10 | 10.928 | d10 | 1.452 | N7 | 1.94595 | ν7 | 17.98 | |
| r11 | −33.933 | d11 | | | 16.559~6.152~0.100 | | | |
| r12 (Stop) | ∞ | d12 | 0.400 | | | | | |
| r13* | 6.352 | d13 | 1.969 | N8 | 1.76802 | ν8 | 49.24 | 13.75 |
| r14 | 31.977 | d14 | 0.010 | N9 | 1.51400 | ν9 | 42.83 | |
| r15 | 31.977 | d15 | 0.500 | N10 | 1.80518 | ν10 | 25.46 | |
| r16 | 6.893 | d16 | 0.010 | N11 | 1.51400 | ν11 | 42.83 | |
| r17 | 6.893 | d17 | 2.298 | N12 | 1.65844 | ν12 | 50.85 | |
| r18 | 14.350 | d18 | 1.676 | | | | | |
| r19* | 53.489 | d19 | 1.000 | N13 | 1.53048 | ν13 | 55.72 | 72.01 |
| r20* | −132.762 | d20 | | | 4.694~8.342~10.120 | | | |
| r21 | 10.338 | d21 | 2.318 | N14 | 1.58913 | ν14 | 61.25 | 42.26 |
| r22 | −30.041 | d22 | 0.400 | N15 | 1.80610 | ν15 | 33.27 | |
| r23 | 27.344 | d23 | | | 4.750~15.075~19.581 | | | |
| r24 | ∞ | d24 | 0.600 | N16 | 1.51680 | ν16 | 64.20 | |
| r25 | ∞ | BF = | | | 2.53~2.53~2.52 | | | |
| Image Plane | ∞ | | | | | | | |

Aspherical Surface Data r13

ε = 1.0192
A4 = −0.12328129E−03
A6 = −0.61500027E−05
A8 = 0.45743699E−06
A10 = −0.14914037E−07 r19

ε = 1.0000
A4 = −0.15593265E−02
A6 = 0.50232743E−04
A8 = −0.11634268E−04
A10 = 0.51061706E−06 r20

ε = 1.0000
A4 = −0.34648925E−03
A6 = 0.75190352E−04
A8 = −0.96402037E−05
A10 = 0.53028998E−06

Miscellaneous Data
Zoom Ratio: 18.94

| | (W) | ~ | (M) | ~ | (T) |
|---|---|---|---|---|---|
| f = | 5.08 | ~ | 22.10 | ~ | 96.20 |
| 2ω = | 76.4° | ~ | 20.5° | ~ | 4.76° |
| BF = | 2.53 | ~ | 2.53 | ~ | 2.52 |
| TL = | 53.9 | ~ | 68.61 | ~ | 79.82 |
| FNO. = | 3.10 | ~ | 4.98 | ~ | 5.70 |
| Y' = | 4.0 | ~ | 4.0 | ~ | 4.0 |

Zoom Lens Group Data

| Group | Focal Length |
|---|---|
| 1st Group | 35.98 |
| 2nd Group | −5.41 |

| | Unit: mm |
|---|---|
| 3rd Group | 12.44 |
| 4th Group | 42.26 |

Example 6

| | Unit: mm | | | | |
|---|---|---|---|---|---|
| | Surface Data | | | | |
| | Radius of Curvature | Axial Distance | Refractive Index | Abbe Number | Focal Length |
| Object Plane | ∞ | d0 ∞ | | | |
| r1 | 76.426 | d1 1.400 | N1 1.91082 | ν1 35.25 | 565.6 |
| r2 | 36.066 | d2 5.098 | N2 1.49700 | ν2 81.61 | |
| r3 | −401.640 | d3 0.100 | | | |
| r4 | 34.378 | d4 4.022 | N3 1.61800 | ν3 63.39 | 67.82 |
| r5 | 182.645 | d5 | 0.874~24.165~43.777 | | |
| r6 | −1503.646 | d6 0.600 | N4 1.91082 | ν4 35.25 | −9.44 |
| r7 | 8.648 | d7 5.251 | | | |
| r8 | −17.493 | d8 0.758 | N5 1.88300 | ν5 40.80 | −44.24 |
| r9 | 15.220 | d9 2.695 | N6 2.00272 | ν6 19.32 | |
| r10* | −54.429 | d10 | 38.344~11.729~1.885 | | |
| r11 (Stop) | ∞ | d11 1.150 | | | |
| r12* | 9.913 | d12 3.106 | N7 1.74330 | ν7 49.33 | 22.75 |
| r13 | −24.512 | d13 4.828 | N8 1.83400 | ν8 37.34 | |
| r14 | 6.745 | d14 2.510 | N9 1.61800 | ν9 63.39 | |
| r15 | 60.554 | d15 0.978 | | | |
| r16* | 151.766 | d16 1.200 | N10 1.53048 | ν10 55.72 | 83.13 |
| r17* | −61.989 | d17 | 6.423~7.890~15.394 | | |
| r18 | 13.140 | d18 2.442 | N11 1.57098 | ν11 50.80 | 54.89 |
| r19 | −44.897 | d19 0.600 | N12 1.90366 | ν12 31.32 | |
| r20 | 45.408 | d20 | 4.955~20.962~25.541 | | |
| r21* | 305.301 | d21 1.790 | N13 1.53048 | ν13 55.72 | 123.98 |
| r22* | −83.660 | d22 0.600 | | | |
| r23 | ∞ | d23 0.600 | N14 1.51680 | ν14 64.20 | |
| r24 | ∞ | BF = | 2.48~2.52~2.46 | | |
| Image Plane | ∞ | | | | |

| Aspherical Surface Data |
|---|
| r10 |

| ε = | 1.0000 |
|---|---|
| A4 = | −0.28722625E−04 |
| A6 = | 0.70295837E−07 |
| A8 = | −0.68877967E−08 |
| A10 = | 0.11192367E−09 | r12

| ε = | 1.0192 |
|---|---|
| A4 = | −0.44021749E−04 |
| A6 = | 0.16475507E−06 |
| A8 = | −0.13614245E−07 |
| A10 = | 0.25768729E−09 | r16

| ε = | 1.0000 |
|---|---|
| A4 = | −0.34297128E−05 |
| A6 = | −0.67008329E−05 |
| A8 = | 0.85895252E−07 |
| A10 = | −0.36761721E−08 | r17

| ε = | 1.0000 |
|---|---|
| A4 = | 0.20347612E−03 |
| A6 = | −0.32120885E−05 |
| A8 = | 0.35029997E−07 | r21

| ε = | 1.0000 |
|---|---|
| A4 = | −0.30346265E−02 |
| A6 = | 0.28884789E−03 |

| Unit: mm | |
|---|---|
| A8 = | −0.17816720E−04 |
| A10 = | 0.37760197E−06 |
| r22 | |
| ε = | 1.0000 |
| A4 = | −0.42305201E−02 |
| A6 = | 0.39623056E−03 |
| A8 = | −0.21495071E−04 |
| A10 = | 0.41555649E−06 |

Miscellaneous Data
Zoom Ratio: 34.09

| | (W) | ~ | (M) | ~ | (T) |
|---|---|---|---|---|---|
| f = | 4.12 | ~ | 24.04 | ~ | 140.45 |
| 2ω = | 88.3° | ~ | 18.9° | ~ | 3.3° |
| BF = | 2.48 | ~ | 2.52 | ~ | 2.46 |
| TL = | 92.81 | ~ | 106.99 | ~ | 128.79 |
| FNO. = | 3.20 | ~ | 5.04 | ~ | 5.90 |
| Y' = | 4.0 | ~ | 4.0 | ~ | 4.0 |

Zoom Lens Group Data

| Group | Focal Length |
|---|---|
| 1st Group | 61.09 |
| 2nd Group | −7.28 |
| 3rd Group | 19.56 |
| 4th Group | 54.89 |
| 5th Group | 123.98 |

Example 7

| Unit: mm | | | | | | | |
|---|---|---|---|---|---|---|---|
| Surface Data | | | | | | | |
| | Radius of Curvature | | Axial Distance | Refractive Index | | Abbe Number | Focal Length |
| Object Plane | ∞ | d0 | ∞ | | | | |
| r1 | 85.256 | d1 | 1.200 | N1 1.90366 | v1 | 31.32 | 521.27 |
| r2 | 37.691 | d2 | 5.306 | N2 1.49700 | v2 | 81.61 | |
| r3 | −242.539 | d3 | 0.100 | | | | |
| r4 | 35.114 | d4 | 4.012 | N3 1.62229 | v3 | 53.17 | 68.52 |
| r5 | 190.221 | d5 | 0.600~24.784~43.639 | | | | |
| r6 | 92.871 | d6 | 0.600 | N4 1.90366 | v4 | 31.32 | −10.89 |
| r7 | 8.873 | d7 | 4.650 | | | | |
| r8 | −12.152 | d8 | 0.500 | N5 1.83481 | v5 | 42.72 | −33.8 |
| r9 | 14.300 | d9 | 1.903 | N6 1.94595 | v6 | 17.98 | |
| r10 | −32.698 | d10 | 0.800 | | | | |
| r11* | −24.217 | d11 | 0.800 | N7 1.58913 | v7 | 61.25 | −66.93 |
| r12* | −63.539 | d12 | 28.378~9.267~0.659 | | | | |
| r13 (Stop) | ∞ | d13 | 1.000 | | | | |
| r14* | 9.219 | d14 | 3.483 | N8 1.74330 | v8 | 49.33 | 19.44 |
| r15 | −18.083 | d15 | 3.460 | N9 1.83400 | v9 | 37.34 | |
| r16 | 6.636 | d16 | 2.601 | N10 1.61800 | v10 | 63.39 | |
| r17 | 158.809 | d17 | 0.715 | | | | |
| r18* | 26.255 | d18 | 1.283 | N11 1.53048 | v11 | 55.72 | 77.26 |
| r19* | 71.828 | d19 | 5.941~9.366~14.168 | | | | |
| r20 | 14.369 | d20 | 2.455 | N12 1.57098 | v12 | 50.80 | 61.91 |
| r21 | −40.101 | d21 | 1.000 | N13 1.90366 | v13 | 31.32 | |
| r22 | 52.671 | d22 | 3.744~18.930~31.379 | | | | |
| r23* | 36.052 | d23 | 1.800 | N14 1.53048 | v14 | 55.72 | 72.23 |
| r24* | 599.956 | d24 | 0.800 | | | | |
| r25 | ∞ | d25 | 0.600 | N15 1.51680 | v15 | 64.20 | |
| r26 | ∞ | BF = | 2.52~2.55~2.62 | | | | |
| Image Plane | ∞ | | | | | | |

-continued

| Unit: mm |
|---|

Aspherical Surface Data r11

| ε = | 1.0000 |
|---|---|
| A4 = | 0.21117130E−03 |
| A6 = | −0.12138508E−04 |
| A8 = | 0.10470648E−06 |
| A10 = | 0.28570893E−09 | r12

| ε = | 1.0000 |
|---|---|
| A4 = | 0.16829279E−03 |
| A6 = | −0.10857180E−04 |
| A8 = | 0.14238292E−06 |
| A10 = | −0.63875237E−09 | r14

| ε = | 1.0192 |
|---|---|
| A4 = | −0.51898770E−04 |
| A6 = | 0.10802812E−05 |
| A8 = | −0.11611541E−06 |
| A10 = | 0.72486478E−08 |
| A12 = | −0.20244033E−09 |
| A14 = | 0.18879901E−11 | r18

| ε = | 1.0000 |
|---|---|
| A4 = | −0.16727629E−03 |
| A6 = | −0.15124851E−04 |
| A8 = | −0.39430676E−06 |
| A10 = | −0.83296333E−09 | r19

| ε = | 1.0000 |
|---|---|
| A4 = | 0.11343300E−03 |
| A6 = | −0.10863046E−04 |
| A8 = | −0.44368767E−06 |
| A10 = | 0.89945171E−08 | r23

| ε = | 1.0000 |
|---|---|
| A4 = | −0.17269178E−02 |
| A6 = | 0.13678435E−03 |
| A8 = | −0.80552161E−05 |
| A10 = | 0.15082436E−06 | r24

| ε = | 1.0000 |
|---|---|
| A4 = | −0.21618556E−02 |
| A6 = | 0.18380507E−03 |
| A8 = | −0.10148114E−04 |
| A10 = | 0.18681040E−06 |

Miscellaneous Data
Zoom Ratio: 37.89

| | (W) | ~ | (M) | ~ | (T) |
|---|---|---|---|---|---|
| f = | 4.11 | ~ | 24.19 | ~ | 155.74 |
| 2ω = | 88.5° | ~ | 18.8° | ~ | 2.9° |
| BF = | 2.52 | ~ | 2.55 | ~ | 2.62 |
| TL = | 80.25 | ~ | 103.96 | ~ | 131.53 |
| FNO. = | 3.09 | ~ | 5.11 | ~ | 6.66 |
| Y' = | 4.0 | ~ | 4.0 | ~ | 4.0 |

Zoom Lens Group Data

| Group | Focal Length |
|---|---|
| 1st Group | 60.85 |
| 2nd Group | −6.41 |
| 3rd Group | 16.91 |
| 4th Group | 61.91 |
| 5th Group | 72.23 |

Example 8

| | | | | Unit: mm | | | |
|---|---|---|---|---|---|---|---|
| | | | | Surface Data | | | |
| | Radius of Curvature | | Axial Distance | | Refractive Index | Abbe Number | Focal Length |
| Object Plane | ∞ | d0 | ∞ | | | | |
| r1 | 84.133 | d1 | 1.400 | N1 | 1.91082 | ν1  35.25 | 662.96 |
| r2 | 38.068 | d2 | 5.492 | N2 | 1.49700 | ν2  81.61 | |
| r3 | −336.115 | d3 | 0.100 | | | | |
| r4 | 36.950 | d4 | 4.513 | N3 | 1.61800 | ν3  63.39 | 69.13 |
| r5 | 260.776 | d5 | | | 0.600~24.917~45.243 | | |
| r6 | 150.570 | d6 | 0.700 | N4 | 1.88300 | ν4  40.80 | −9.56 |
| r7 | 7.972 | d7 | 4.442 | | | | |
| r8* | −16.831 | d8 | 0.700 | N5 | 1.85135 | ν5  40.10 | −11.57 |
| r9* | 24.193 | d9 | 0.080 | | | | |
| r10 | 28.201 | d10 | 2.001 | N6 | 1.94595 | ν6  17.98 | 16.18 |
| r11 | −32.321 | d11 | | | 37.763~12.070~1.837 | | |
| r12 (Stop) | ∞ | d12 | 1.330 | | | | |
| r13* | 7.942 | d13 | 3.370 | N7 | 1.72903 | ν7  54.04 | 9.9 |
| r14* | −65.147 | d14 | 0.100 | | | | |
| r15 | 31.845 | d15 | 1.002 | N8 | 1.85026 | ν8  32.29 | −12.27 |
| r16 | 7.744 | d16 | 0.809 | | | | |
| r17 | 12.361 | d17 | 1.377 | N9 | 2.00069 | ν9  25.46 | 53.34 |
| r18 | 5.751 | d18 | 1.615 | N10 | 1.64769 | ν10  33.84 | |
| r19 | 140.689 | d19 | | | 5.278~8.518~16.583 | | |
| r20 | 15.940 | d20 | 1.997 | N11 | 1.56883 | ν11  56.04 | 63.16 |
| r21 | −60.130 | d21 | 0.800 | N12 | 1.91082 | ν12  35.25 | |
| r22 | 68.478 | d22 | | | 4.808~16.773~18.560 | | |
| r23* | −57.448 | d23 | 1.750 | N13 | 1.53048 | ν13  55.72 | 76.82 |
| r24* | −24.091 | d24 | 0.600 | | | | |
| r25 | ∞ | d25 | 0.600 | N14 | 1.51680 | ν14  64.20 | |
| r26 | ∞ | BF = | | | 2.51~2.53~2.52 | | |
| Image Plane | ∞ | | | | | | |

| Aspherical Surface Data |
|---| r8

ϵ = 1.0000
A4 = −0.81577446E−03
A6 = 0.29515896E−04
A8 = −0.52806794E−06
A10 = 0.32242657E−08 r9

ϵ = 1.0000
A4 = −0.81397010E−03
A6 = 0.33215788E−04
A8 = −0.65385166E−06
A10 = 0.51167455E−08 r13

ϵ = 1.0192
A4 = −0.16055191E−03
A6 = −0.35061340E−05
A8 = 0.52149723E−07
A10 = −0.34150813E−08 r14

ϵ = 1.0000
A4 = 0.31171734E−04
A6 = −0.19424587E−05
A8 = 0.45827221E−07
A10 = −0.31161108E−08 r23

ϵ = 1.0000
A4 = −0.12118886E−04
A6 = 0.74955612E−05
A8 = −0.31696535E−05
A10 = 0.77455297E−07 r24

ϵ = 1.0000
A4 = 0.30787651E−03
A6 = −0.89968884E−05

| Unit: mm | |
|---|---|
| A8 = | −0.31196660E−05 |
| A10 = | 0.84837210E−07 |

Miscellaneous Data
Zoom Ratio: 34.15

|  | (W) | ~ | (M) | ~ | (T) |
|---|---|---|---|---|---|
| f = | 3.96 | ~ | 23.14 | ~ | 135.24 |
| 2ω = | 90.6° | ~ | 19.6° | ~ | 3.4° |
| BF = | 2.51 | ~ | 2.53 | ~ | 2.52 |
| TL = | 85.74 | ~ | 99.58 | ~ | 119.52 |
| FNO. = | 3.11 | ~ | 5.01 | ~ | 5.90 |
| Y' = | 4.0 | ~ | 4.0 | ~ | 4.0 |

Zoom Lens Group Data

| Group | Focal Length |
|---|---|
| 1st Group | 63.03 |
| 2nd Group | −7.71 |
| 3rd Group | 17.77 |
| 4th Group | 56.41 |
| 5th Group | 76.82 |

Example 9

Unit: mm

Surface Data

| | Radius of Curvature | | Axial Distance | Refractive Index | | Abbe Number | Focal Length |
|---|---|---|---|---|---|---|---|
| Object Plane | ∞ | d0 | ∞ | | | | |
| r1 | 70.943 | d1 | 1.400 | N1 1.91082 | v1 | 35.25 | 540.28 |
| r2 | 35.473 | d2 | 5.025 | N2 1.49700 | v2 | 81.61 | |
| r3 | −862.664 | d3 | 0.100 | | | | |
| r4 | 34.115 | d4 | 4.286 | N3 1.61800 | v3 | 63.39 | 69.81 |
| r5 | 155.225 | d5 | 0.957~24.468~44.454 | | | | |
| r6 | −499.848 | d6 | 0.700 | N4 1.90366 | v4 | 31.32 | −9.79 |
| r7 | 9.011 | d7 | 5.209 | | | | |
| r8* | −15.202 | d8 | 0.118 | N5 1.51790 | v5 | 52.31 | −40.92 |
| r9 | −15.437 | d9 | 0.600 | N6 1.85135 | v6 | 40.10 | |
| r10 | 15.988 | d10 | 2.365 | N7 1.94595 | v7 | 17.98 | |
| r11 | −40.505 | d11 | 38.890~11.816~1.857 | | | | |
| r12 (Stop) | ∞ | d12 | 1.150 | | | | |
| r13* | 9.533 | d13 | 2.815 | N8 1.72903 | v8 | 54.04 | 37.88 |
| r14 | −22.443 | d14 | 3.910 | N9 1.83481 | v9 | 42.72 | |
| r15 | 13.103 | d15 | 0.903 | | | | |
| r16 | 15.256 | d16 | 2.500 | N10 1.90366 | v10 | 31.32 | 30.89 |
| r17 | 7.375 | d17 | 1.828 | N11 1.62263 | v11 | 58.16 | |
| r18* | −67.295 | d18 | 6.830~8.362~16.157 | | | | |
| r19 | 12.510 | d19 | 2.474 | N12 1.57098 | v12 | 50.80 | 50.41 |
| r20 | −64.719 | d20 | 0.700 | N13 1.90366 | v13 | 31.32 | |
| r21 | 39.234 | d21 | 5.095~20.828~25.304 | | | | |
| r22* | −52.951 | d22 | 1.800 | N14 1.53048 | v14 | 55.72 | 94.98 |
| r23* | −26.122 | d23 | 0.600 | | | | |
| r24 | ∞ | d24 | 0.600 | N15 1.51680 | v15 | 64.20 | |
| r25 | ∞ | BF = | 2.50~2.56~2.59 | | | | |
| Image Plane | ∞ | | | | | | |

Aspherical Surface Data r8

| ε = | 1.0000 |
|---|---|
| A4 = | 0.84203098E−04 |
| A6 = | −0.37506313E−06 |
| A8 = | 0.31714128E−07 |
| A10 = | −0.36749906E−09 |

-continued

| Unit: mm |
| --- |

| r13 | |
| --- | --- |
| ϵ = | 1.0192 |
| A4 = | −0.48766973E−04 |
| A6 = | −0.13321288E−06 |
| A8 = | 0.30172647E−08 |
| A10 = | −0.19794136E−09 |

| r18 | |
| --- | --- |
| ϵ = | 1.0000 |
| A4 = | 0.17150084E−03 |
| A6 = | 0.19458234E−05 |
| A8 = | 0.85501879E−07 |

| r22 | |
| --- | --- |
| ϵ = | 1.0000 |
| A4 = | −0.15044471E−02 |
| A6 = | 0.55604525E−04 |
| A8 = | −0.23243027E−05 |
| A10 = | −0.65929710E−09 |

| r23 | |
| --- | --- |
| ϵ = | 1.0000 |
| A4 = | −0.21486983E−02 |
| A6 = | 0.12910881E−03 |
| A8 = | −0.57900978E−05 |
| A10 = | 0.77972516E−07 |

| Miscellaneous Data Zoom Ratio: 34.13 | | | | | |
| --- | --- | --- | --- | --- | --- |
| | (W) | ~ | (M) | ~ | (T) |
| f = | 4.15 | ~ | 24.23 | ~ | 141.65 |
| 2ω = | 87.9° | ~ | 18.8° | ~ | 3.2° |
| BF = | 2.50 | ~ | 2.56 | ~ | 2.59 |
| TL = | 93.36 | ~ | 107.12 | ~ | 129.44 |
| FNO. = | 3.24 | ~ | 5.08 | ~ | 5.90 |
| Y' = | 4.0 | ~ | 4.0 | ~ | 4.0 |

| Zoom Lens Group Data | |
| --- | --- |
| Group | Focal Length |
| 1st Group | 62.51 |
| 2nd Group | −7.37 |
| 3rd Group | 20.13 |
| 4th Group | 50.41 |
| 5th Group | 94.98 |

Example 10

| Unit: mm | | | | | | | |
| --- | --- | --- | --- | --- | --- | --- | --- |
| Surface Data | | | | | | | |
| | Radius of Curvature | | Axial Distance | | Refractive Index | Abbe Number | Focal Length |
| Object Plane | ∞ | d0 | ∞ | | | | |
| r1 | 73.999 | d1 | 1.413 | N1 | 1.90366 | ν1 31.32 | 799.11 |
| r2 | 35.944 | d2 | 4.685 | N2 | 1.49700 | ν2 81.61 | |
| r3 | −1956.105 | d3 | 0.100 | | | | |
| r4 | 36.812 | d4 | 3.972 | N3 | 1.62229 | ν3 53.17 | 67.94 |
| r5 | 272.976 | d5 | 1.027~23.596~45.275 | | | | |
| r6 | −851.086 | d6 | 0.600 | N4 | 1.91082 | ν4 35.25 | −8.54 |
| r7 | 7.856 | d7 | 6.249 | | | | |
| r8 | −30.245 | d8 | 0.600 | N5 | 1.88300 | ν5 40.80 | −89.04 |
| r9 | 15.542 | d9 | 2.266 | N6 | 2.00272 | ν6 19.32 | |
| r10* | −101.708 | d10 | 39.736~11.108~1.918 | | | | |
| r11 (Stop) | ∞ | d11 | 1.150 | | | | |
| r12* | 10.265 | d12 | 3.280 | N7 | 1.74330 | ν7 49.33 | 21.92 |
| r13 | −32.346 | d13 | 4.797 | N8 | 1.83400 | ν8 37.34 | |
| r14 | 6.533 | d14 | 2.510 | N9 | 1.61800 | ν9 63.39 | |

-continued

| | | | | | | | |
|---|---|---|---|---|---|---|---|
| | Unit: mm |

| | | | | | | | |
|---|---|---|---|---|---|---|---|
| r15 | 201.541 | d15 | 0.769 | | | | |
| r16* | 39.369 | d16 | 1.411 | N10 | 1.53048 | ν10 55.72 | 97.88 |
| r17* | 160.826 | d17 | | colspan="3" | 6.292~6.678~15.559 | |
| r18 | 17.301 | d18 | 2.488 | N11 | 1.57098 | ν11 50.80 | |
| r19 | −27.438 | d19 | 1.000 | N12 | 1.90366 | ν12 31.32 | 97.88 |
| r20 | 124.407 | d20 | | colspan="3" | 6.295~23.628~27.861 | |
| r21 | ∞ | d21 | 0.600 | N13 | 1.51680 | ν13 64.20 | 67.98 |
| r22 | ∞ | BF = | | colspan="3" | 2.51~2.51~2.49 | |
| Image Plane | ∞ | | | | | | |

Aspherical Surface Data r10

$\epsilon$ = 1.0000
A4 = −0.50672659E−04
A6 = −0.80963140E−08
A8 = −0.64752836E−08
A10 = −0.81677878E−11 r12

$\epsilon$ = 1.0192
A4 = −0.41532358E−04
A6 = 0.21860484E−06
A8 = −0.14205445E−07
A10 = 0.22199007E−09 r16

$\epsilon$ = 1.0000
A4 = 0.28338729E−04
A6 = −0.13228681E−04
A8 = 0.59833721E−06
A10 = −0.20040570E−07 r17

$\epsilon$ = 1.0000
A4 = 0.18633951E−03
A6 = −0.10061279E−04
A8 = 0.47437869E−06
A10 = −0.15522887E−07

Miscellaneous Data
Zoom Ratio: 34.13

| | (W) | ~ | (M) | ~ | (T) |
|---|---|---|---|---|---|
| f = | 4.11 | ~ | 24.01 | ~ | 140.28 |
| 2ω = | 88.5 | ~ | 18.9° | ~ | 3.3° |
| BF = | 2.51 | ~ | 2.51 | ~ | 2.49 |
| TL = | 93.74 | ~ | 105.41 | ~ | 130.99 |
| FNO. = | 3.01 | ~ | 4.89 | ~ | 5.90 |
| Y' = | 4.0 | ~ | 4.0 | ~ | 4.0 |

Zoom Lens Group Data

| Group | Focal Length |
|---|---|
| 1st Group | 63.31 |
| 2nd Group | −7.43 |
| 3rd Group | 19.38 |
| 4th Group | 67.98 |

TABLE 1

| | Conditional Formula(A1) $f3/\sqrt{(fw \times ft)}$ | Conditional Formula(A2) CR32/f3 | Conditional Formula(A3) Nd11 | Conditional Formula(A4) νd11 | Conditional Formula(A5) β4t/β4w | Conditional Formula(A6) dist* |
|---|---|---|---|---|---|---|
| EX1 | 0.71 | 0.38 | 1.91082 | 35.25 | 0.62 | −19.6 |
| EX2 | 0.64 | 0.59 | 1.90366 | 31.32 | 0.44 | −19.1 |
| EX3 | 0.67 | 0.37 | 1.90366 | 31.32 | 0.56 | −18.7 |
| EX4 | 0.82 | 0.34 | 1.90366 | 31.32 | 0.49 | −19.8 |
| EX5 | 0.56 | 0.55 | 1.90366 | 31.32 | 0.52 | −19.0 |

*dist = {(ywmax − Ymax)/Ymax} × 100

TABLE 2

|  | Conditional Formula (B1) $\beta2t/\beta2w$ | Conditional Formula (B2) $\beta3t/\beta3w$ | Conditional Formula (B3) (B1)/(B2) | Conditional Formula (B4) Nd11 | Conditional Formula (B5) vd11 |
|---|---|---|---|---|---|
| EX6 | 8.81 | 7.81 | 1.13 | 1.91082 | 35.25 |
| EX7 | 8.37 | 10.69 | 0.78 | 1.90366 | 31.32 |
| EX8 | 8.91 | 5.61 | 1.59 | 1.91082 | 35.25 |
| EX9 | 8.84 | 8.86 | 1.00 | 1.91082 | 35.25 |
| EX10 | 7.99 | 7.09 | 1.13 | 1.90366 | 31.32 |

|  | Conditional Formula (B6) $\beta4t/\beta4w$ | Conditional Formula (B7) dist* | Conditional Formula (B8) m3/TLt | Conditional Formula (B9) m4/TLt |
|---|---|---|---|---|
| EX6 | 0.50 | −19.8 | −0.23 | −0.16 |
| EX7 | 0.42 | −19.8 | −0.27 | −0.21 |
| EX8 | 0.68 | −20.1 | −0.21 | −0.12 |
| EX9 | 0.44 | −19.8 | −0.23 | −0.16 |
| EX10 | 0.60 | −19.8 | −0.24 | −0.16 |

*dist = {(ywmax − Ymax/Ymax} × 100

LIST OF REFERENCE SYMBOLS

DU digital apparatus
LU imaging optical device
ZL zoom lens system
Gr1 first lens group
Gr2 second lens group
Gr3 third lens group
Gr4 fourth lens group
Gr5 fifth lens group
L31 first lens element (cemented lens element)
L32 second lens element
ST stop (aperture stop)
SR image sensing device
SS light receiving surface (imaging surface)
IM image plane (optical image)
AX optical axis
1 signal processing portion
2 control portion
3 memory
4 operation portion
5 display portion

The invention claimed is:

1. A zoom lens system comprising, sequentially from an object side:
a first lens group having a positive optical power;
a second lens group having a negative optical power;
a third lens group having a positive optical power; and
a fourth lens group having a positive optical power,
the zoom lens system achieving variable power by moving the first to fourth lens groups to change an inter-group distance between the lens groups,
wherein
the third lens group includes two lens elements at least one of which has an aspherical surface,
an object-side lens element of the third lens group is a cemented lens element including, sequentially from the object side, a positive lens element, a negative lens element, and a positive lens element, and
the third lens group satisfies the following conditional formula (A2):

$$0.3 < CR32/f3 < 0.65 \tag{A2}$$

where
CR32 represents a radius of curvature of an image-side surface of the negative lens element included in the cemented lens element, and
f3 represents a focal length of the third lens group.

2. A zoom lens system comprising, sequentially from an object side:
a first lens group having a positive optical power;
a second lens group having a negative optical power;
a third lens group having a positive optical power; and
a fourth lens group having a positive optical power,
the zoom lens system achieving variable power by moving the first to fourth lens groups to change an inter-group distance between the lens groups,
wherein
the third lens group includes two lens elements at least one of which has an aspherical surface,
an object-side lens element of the third lens group is a cemented lens element including, sequentially from the object side, a positive lens element, a negative lens element, and a positive lens element,
the first lens group includes, sequentially from the object side, a cemented lens element including a negative lens element and a positive lens element, and a positive single lens element, and
the first lens group satisfies the following conditional formulas (A3) and (A4):

$$1.86 < Nd11 < 2 \tag{A3}$$

$$30 < vd11 < 40 \tag{A4}$$

where
Nd11 represents a refractive index of the negative lens element included in the first lens group with respect to a d-line, and
vd11 represents an Abbe number of the negative lens element included in the first lens group with respect to the d-line.

3. A zoom lens system comprising, sequentially from an object side:
a first lens group having a positive optical power;
a second lens group having a negative optical power;
a third lens group having a positive optical power; and
a fourth lens group having a positive optical power,
the zoom lens system achieving variable power by moving the first to fourth lens groups to change an inter-group distance between the lens groups,
wherein
the third lens group includes two lens elements at least one of which has an aspherical surface,
an object-side lens element of the third lens group is a cemented lens element including, sequentially from the object side, a positive lens element, a negative lens element, and a positive lens element, and
the following conditional formula (A5) is satisfied:

$$0.3 < \beta4t/\beta4w < 0.7 \tag{A5}$$

where
$\beta4t$ represents a lateral magnification of the fourth lens group at a telephoto end, and
$\beta4w$ represents a lateral magnification of the fourth lens group at a wide angle end.

4. The zoom lens system according to claim 1,
wherein
the third lens group satisfies the following conditional formula (A1):

$$0.5 < f3/\sqrt{(fw \times ft)} < 0.9 \tag{A1}$$

where f3 represents the focal length of the third lens group, fw represents a focal length of a whole system at a wide angle end, and ft represents a focal length of the whole system at a telephoto end.

5. The zoom lens system according to claim 1, wherein, of the positive lens elements included in the cemented lens element, one that is disposed closest to the object side has an aspherical surface, and a radius of curvature of the aspherical surface is larger than a reference radius of curvature by a larger value farther away from an optical axis.

6. The zoom lens system according to claim 1, wherein the following conditional formula (A6) is satisfied:

$$-10 < \{(ywmax - Ymax)/Ymax\} \times 100 < -25 \tag{A6}$$

where ywmax represents a maximum real image height at a wide angle end, and

Ymax represents a maximum ideal image height.

7. The zoom lens system according to claim 1, wherein the following conditional formulas (B1) to (B3) are satisfied:

$$7 < \beta 2t/\beta 2w < 10 \tag{B1}$$

$$5 < \beta 3t/\beta 3w < 12 \tag{B2}$$

$$0.7 < (\beta 2t/\beta 2w)/(\beta 3t/(\beta 3w) < 1.65 \tag{B3}$$

where

β2t represents a lateral magnification of the second lens group at a telephoto end, β2w represents a lateral magnification of the second lens group at a wide angle end, β3t represents a lateral magnification of the third lens group at the telephoto end, and β3w represents a lateral magnification of the third lens group at the wide angle end.

8. The zoom lens system according to claim 2, wherein the third lens group satisfies the following conditional formula (A1):

$$0.5 < f3/\sqrt{(fw \times ft)} < 0.9 \tag{A1}$$

where f3 represents a focal length of the third lens group, fw represents a focal length of a whole system at a wide angle end, and ft represents a focal length of the whole system at a telephoto end.

9. The zoom lens system according to claim 2, wherein, of the positive lens elements included in the cemented lens element, one that is disposed closest to the object side has an aspherical surface, and a radius of curvature of the aspherical surface is larger than a reference radius of curvature by a larger value farther away from an optical axis.

10. The zoom lens system according to claim 2, wherein the following conditional formula (A6) is satisfied:

$$-10 < \{(ywmax - Ymax)/Ymax\} \times 100 < -25 \tag{A6}$$

where ywmax represents a maximum real image height at a wide angle end, and

Ymax represents a maximum ideal image height.

11. The zoom lens system according to claim 2, wherein the following conditional formulas (B1) to (B3) are satisfied:

$$7 < \beta 2t/\beta 2w < 10 \tag{B1}$$

$$5 < \beta 3t/\beta 3w < 12 \tag{B2}$$

$$0.7 < (\beta 2t/\beta 2w)/(\beta 3t/\beta 3w) < 1.65 \tag{B3}$$

where

β2t represents a lateral magnification of the second lens group at a telephoto end, β2w represents a lateral magnification of the second lens group at a wide angle end, β3t represents a lateral magnification of the third lens group at the telephoto end, and β3w represents a lateral magnification of the third lens group at the wide angle end.

12. The zoom lens system according to claim 3, wherein the third lens group satisfies the following conditional formula (A1):

$$0.5 < f3/\sqrt{(fw \times ft)} < 0.9 \tag{A1}$$

where f3 represents a focal length of the third lens group, fw represents a focal length of a whole system at the wide angle end, and ft represents a focal length of the whole system at the telephoto end.

13. The zoom lens system according to claim 3, wherein, of the positive lens elements included in the cemented lens element, one that is disposed closest to the object side has an aspherical surface, and a radius of curvature of the aspherical surface is larger than a reference radius of curvature by a larger value farther away from an optical axis.

14. The zoom lens system according to claim 3, wherein the following conditional formula (A6) is satisfied:

$$-10 < \{(ywmax - Ymax)/Ymax\} \times 100 < -25 \tag{A6}$$

where ywmax represents a maximum real image height at the wide angle end, and

Ymax represents a maximum ideal image height.

15. The zoom lens system according to claim 3, wherein the following conditional formulas (B1) to (B3) are satisfied:

$$7 < \beta 2t/\beta 2w < 10 \tag{B1}$$

$$5 < \beta 3t/\beta 3w < 12 \tag{B2}$$

$$0.7 < (\beta 2t/\beta 2w)/(\beta 3t/\beta 3w) < 1.65 \tag{B3}$$

where

β2t represents a lateral magnification of the second lens group at the telephoto end, β2w represents a lateral magnification of the second lens group at the wide angle end, β3t represents a lateral magnification of the third lens group at the telephoto end, and β3w represents a lateral magnification of the third lens group at the wide angle end.

16. An imaging optical device comprising:

a zoom lens system according to claim 1; and an image sensing device that converts an optical image formed on a light receiving surface into an electric signal, wherein
the zoom lens system is arranged such that an optical image of a subject is formed on the light receiving surface of the image sensing device.

17. A digital apparatus comprising the imaging optical device according to claim 16 so as to be additionally provided with at least one of a function of shooting a still image of the subject and a function of shooting a moving image of the subject.

18. The digital apparatus according to claim 17, wherein
the digital apparatus is one of a digital camera, a surveillance camera, and a portable terminal unit equipped with an image input function.

19. An imaging optical device comprising:
a zoom lens system according to claim 2; and
an image sensing device that converts an optical image formed on a light receiving surface into an electric signal,
wherein
the zoom lens system is arranged such that an optical image of a subject is formed on the light receiving surface of the image sensing device.

20. An imaging optical device comprising:
a zoom lens system according to claim 3; and
an image sensing device that converts an optical image formed on a light receiving surface into an electric signal,
wherein
the zoom lens system is arranged such that an optical image of a subject is formed on the light receiving surface of the image sensing device.

\* \* \* \* \*